(12) United States Patent
Robb et al.

(10) Patent No.: US 12,236,376 B2
(45) Date of Patent: Feb. 25, 2025

(54) INTEGRATED TIME AWAY MANAGEMENT MECHANISM

(71) Applicant: Microsoft Technology Licensing, LLC, Redmond, WA (US)

(72) Inventors: Leanna Holly Robb, Seattle, WA (US); Wendy Guo, Edmonds, WA (US); Nagendra Kalyan Nanduru, Redmond, WA (US); Michelle Casanova, Portland, OR (US); Tor Andrew Imsland, Kirkland, WA (US); Bichong Li, Suzhou (CN); Feng Zhang, Suzhou (CN); Sandeep Seri, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 17/769,258

(22) PCT Filed: Nov. 3, 2019

(86) PCT No.: PCT/CN2019/115192
§ 371 (c)(1),
(2) Date: Apr. 14, 2022

(87) PCT Pub. No.: WO2021/082025
PCT Pub. Date: May 6, 2021

(65) Prior Publication Data
US 2023/0186194 A1 Jun. 15, 2023

(51) Int. Cl.
*G06Q 10/0631* (2023.01)
(52) U.S. Cl.
CPC .......................... *G06Q 10/063114* (2013.01)
(58) Field of Classification Search
None
See application file for complete search history.

(56) References Cited

U.S. PATENT DOCUMENTS 6,615,166 B1 * 9/2003 Guheen ................. G06Q 10/06
703/27
7,236,977 B1 * 6/2007 Seiler ................... G06Q 10/109
707/999.1
(Continued)

FOREIGN PATENT DOCUMENTS

WO 2012148904 A1 11/2012

OTHER PUBLICATIONS

"Paid Time Off Trends in the U.S.", Retrieved from: https://web.archive.org/web/20190930042146/https://www.ustravel.org/sites/default/files/media_root/document/Paid%20Time%20Off%20Trends%20Fact%20Sheet.pdf, Sep. 30, 2019, 2 Pages.
(Continued)

*Primary Examiner* — Folashade Anderson
(74) *Attorney, Agent, or Firm* — Schwegman Lundberg & Woessner, P.A.

(57) ABSTRACT

A computer implemented method includes receiving a start date and an end date specifying a future absence or away-from-work time period for a user, generating an away from office communication specifying the away-from-work time period, retrieving via the computer a list of collaborators based on frequency and duration of recent interactions with the user, receiving via the computer a selection of collaborators from the list, identifying meetings involving the user during the away-from-work time period, generating via the computer a list of user viewable items for the user to complete prior to the away-from-work time period, and generating via the computer a list of items for the user to attend to upon return from the away-from-work time period for presentation to the user upon return.

15 Claims, 26 Drawing Sheets

(56) References Cited

U.S. PATENT DOCUMENTS

| | | | | |
|---|---|---|---|---|
| 2008/0091504 | A1* | 4/2008 | Lyle | G06Q 10/109 705/7.19 |
| 2008/0127231 | A1* | 5/2008 | Shaffer | G06Q 10/109 715/764 |
| 2009/0077183 | A1* | 3/2009 | Bruce | G06Q 10/107 709/206 |
| 2009/0102637 | A1 | 4/2009 | Hsu | |
| 2015/0135088 | A1 | 5/2015 | Lim et al. | |
| 2015/0169285 | A1* | 6/2015 | Reyes | G06F 3/167 715/728 |
| 2016/0217429 | A1 | 7/2016 | Lau et al. | |
| 2021/0097473 | A1* | 4/2021 | Kakaire | G06Q 10/063114 |
| 2022/0343079 | A1* | 10/2022 | Bhattacharya | G06N 20/00 |

OTHER PUBLICATIONS

"The State of American Vacation 2017", Retrieved Date: http://web.archive.org/web/20180508111737/https://projecttimeoff.com/reports/the-state-of-american-vacation-2017/, May 8, 2018, 5 Pages.

"The Power of Vacation Planning", Retrieved from: https://web.archive.org/web/20200806114822/https://www.ustravel. org/sites/default/files/media_root/document/2018_Jan29_Reasearch_The%20Power%20of%20Vacation%20Planning.pdf, Aug. 6, 2020, 9 Pages.

Achor, et al., "The Data-Driven Case for Vacation", Retrieved from: https://hbr.org/2016/07/the-data-driven-case-for-vacation, Jul. 13, 2016, 6 Pages.

"International Search Report and Written Opinion Issued in PCT Application No. PCT/CN19/115192", Mailed Date: Jul. 24, 2020, 9 Pages.

Walsh, Dylan, "Stanford Professor: "The Workplace is Killing People and Nobody Cares"", Retrieved from: https:// www.fastcompany.com/90282735/the-workplace-is-killing-people-and-nobody-cares, Dec. 19, 2018, 14 Pages.

"Extended Search Report Issued in European Patent Application No. 19950628.8", Mailed Date: Jul. 3, 2023, 8 Pages.

"6 Reasons Employees Don't Use Vacation Time (and Why They Should)", Retrieved from https://www.replicon.com/blog/6-reasons-employees-dont-use-vacation-time/, Sep. 22, 2016, 3 Pages.

"How After-Hours Emails Might Hurt Your Health", Retrieved from https://www.psychologicalscience.org/news/minds-business/how-afterhours-emails-might-hurt-your-health.html, Retrieved on Nov. 8, 2019, 4 Pages.

"State of American Vacation 2018", Retrieved from https://www.ustravel.org/research/state-american-vacation-2018, May 8, 2018, 2 Pages.

Achor, Shawn, "When a Vacation Reduces Stress—And When It Doesn't", Retrieved from https://hbr.org/2014/02/when-a-vacation-reduces-stress-and-when-it-doesnt, Feb. 14, 2014, 5 Pages.

Fried, Carla, "Vacation Mindset: How Weekends Can Be More Refreshing", Retrieved from https://www.anderson.ucla.edu/faculty-and-research/anderson-review/vacation-mindset, Feb. 20, 2019, 9 Pages.

Kushlev, et al., "Checking Email Less Frequently Reduces Stress", In Journal of Computers in Human Behavior, vol. 43, Issue 3, Feb. 1, 2015, pp. 220-228.

McCarthy, Justin, "Six in 10 Americans Took a Vacation in 2017", Retrieved from https://news.gallup.com/poll/224843/six-americans-took-vacation-2017.aspx, Jan. 3, 2018, 7 Pages.

McCarthy, Justin, "Taking Regular Vacations May Help Boost Americans' Well-Being", Retrieved from https://news.gallup.com/poll/180335/taking-regular-vacations-may-help-boost-americans.aspx, Dec. 30, 2014, 6 Pages.

Wigert, et al., "Employee Burnout, Part 1: The 5 Main Causes", Retrieved from https://www.gallup.com/workplace/237059/employee-burnout-part-main-causes.aspx?g_source=link_WWWWV9&g_medium=related_insights_tile1&g_campaign=item_215924&g_content=Employee%20Burnout,%20Part%201:%20The%205%20Main%20Causes, Jul. 12, 2018, 10 Pages.

Williams, et al., "Supporting Workplace Detachment and Reattachment with Conversational Intelligence", In Proceedings of the 2018 CHI Conference on Human Factors in Computing Systems, Paper No. 88, Apr. 21, 2018, 13 Pages.

"Extended Search Report Issued in European Patent Application No. 19950628.8", Mailed Date: Jul. 3, 2023, 8 Pages. (Ms# 407727-EP-EPT).

\* cited by examiner

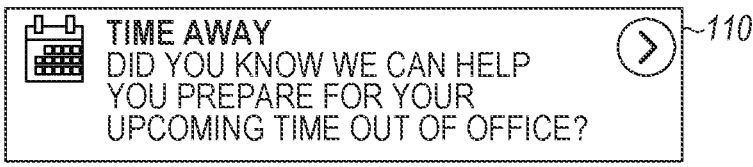
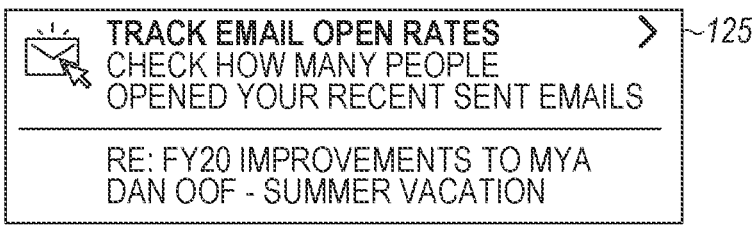
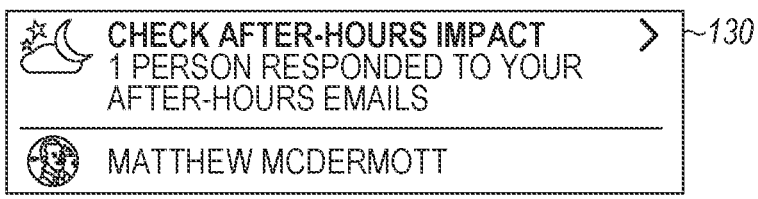
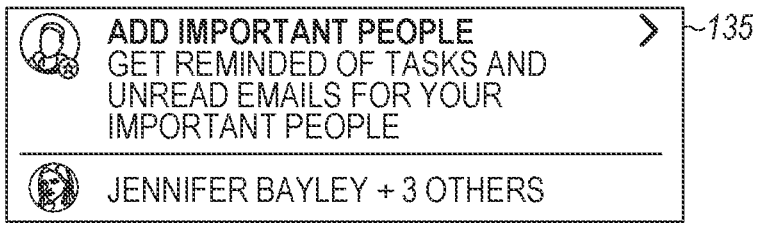
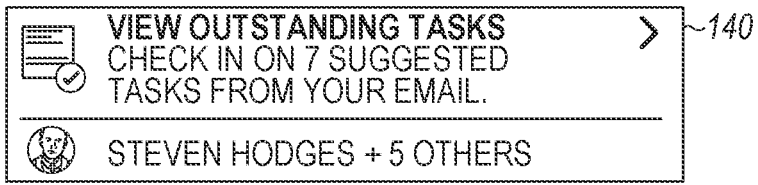
FIG. 1

```
                                                    📌 ✕      ⟋―900
    INSIGHTS
    ‹             📊 ⚙ ☺
    OUT OF OFFICE TASKS        DISMISS ALL
```

| ✓ | SCHEDULED OOF<br>JULY 8 - JULY 31, 2019 | ✏ |

| ✓ | DRAFTED AUTO-REPLY<br>COMPOSED OOF REPLY | ✏ |

| ✓ | NOTIFY COLLABORATORS<br>SENT EMAIL AND MEETING INVITE | ✏ |

| ✓ | RESOLVE MEETINGS<br>CANCEL MEETINGS WHILE I AM OUT | ✕ |

🗨 REVIEW MEETINGS                          ⌃

DECLINE MEETINGS WITH THIS MESSAGE:

I WILL BE OUT OF THE OFFICE FROM 06/08/2019 TO 06/31/19

SELECT MEETINGS TO DECLINE & CANCEL

915 — ☑ SELECT ALL
920 — ☑ 7/8   1: DEBRA                    OPEN
921 — ☑ 7/8   EXEC STRATEGY MEET...       OPEN
922 — ☑ 7/9   COFFEE WITH DENNIS          OPEN
923 — ☑ 7/9   EXEC BUDGET MEET...         OPEN
924 — ☑ 7/10  COFFEE WITH DENNIS          OPEN

LOAD ALL 17 MEETINGS

[ DECLINE & CANCEL ] — 930

| ✓ | SCHEDULE FOCUS TIME<br>BEFORE AND AFTER YOUR VACATION | ✕ |

REVIEW OPEN SLOTS              ⌄

INSIGHTS

WHAT'S NEW  JULY 1 - JULY 31

TIME AWAY — 1610
YOU'RE ALL SET. CHECK BACK HERE TO EDIT OR MANAGE ANY OF YOUR OUT OF OFFICE TASKS.

1615:
- ✓ SCHEDULED JULY 8 - JULY 31ST
- ✓ COMPOSED EMAIL AUTO-REPLY
- ✓ NOTIFY COLLABORATORS
- ✓ RESOLVED MEETINGS
- ✓ SCHEDULED CATCH UP TIME

TRACK EMAIL OPEN RATES
CHECK HOW MANY PEOPLE OPENED YOUR RECENT SENT EMAILS

RE: FY20 IMPROVEMENTS TO MYA
DAN OOF - SUMMER VACATION

CHECK AFTER-HOURS IMPACT
1 PERSON RESPONDED TO YOUR AFTER-HOURS EMAILS

MATTHEW MCDERMOTT

ADD IMPORTANT PEOPLE
GET REMINDED OF TASKS AND UNREAD EMAILS FOR YOUR IMPORTANT PEOPLE

JENNIFER BAYLEY + 3 OTHERS

VIEW OUTSTANDING TASKS
CHECK IN ON 7 SUGGESTED TASKS FROM YOUR EMAIL.

STEVEN HODGES + 5 OTHERS

*FIG. 16*

INSIGHTS

WHAT'S NEW      JULY 1 - JULY 31

 WELCOME BACK!
LET'S HELP YOU RAMP UP AFTER GETTING BACK FROM YOUR TIME AWAY FROM THE OFFICE.

- ⊘ READ MOST IMPORTANT EMAILS
- ⊘ CATCH UP WITH TOP COLLABORATORS
- ⊘ REVIEW LATEST SHARED DOCUMENTS
- ⊘ SCHEDULE CATCH UP TIME
- ⊘ REVIEW ACTIVITY WHILE YOU WERE AWAY

 TRACK EMAIL OPEN RATES
CHECK HOW MANY PEOPLE OPENED YOUR RECENT SENT EMAILS

RE: FY20 IMPROVEMENTS TO MYA
DAN OOF - SUMMER VACATION

 CHECK AFTER-HOURS IMPACT
1 PERSON RESPONDED TO YOUR AFTER-HOURS EMAILS

MICHAEL SENKOW

 ADD IMPORTANT PEOPLE
GET REMINDED OF TASKS AND UNREAD EMAILS FOR YOUR IMPORTANT PEOPLE

HELEN HARMETZ + 3 OTHERS

 VIEW OUTSTANDING TASKS
CHECK IN ON 7 SUGGESTED TASKS FROM YOUR EMAIL.

PETER BERGEN + 5 OTHERS

*FIG. 17*

INSIGHTS

WHAT'S NEW — JULY 1 - JULY 31

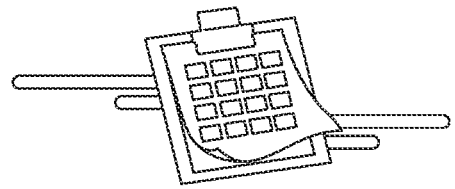

OUT OF OFFICE CURRENTLY ACTIVE
NOTIFICATIONS HAVE BEEN MUTED AND YOUR FEED HAS BEEN PAUSED UNTIL YOU RETURN.

1820 — [ EDIT SETTINGS ]   [ CANCEL OOF ] — 1830

1810

 TRACK EMAIL OPEN RATES 
CHECK HOW MANY PEOPLE OPENED YOUR RECENT SENT EMAILS

RE: FY20 IMPROVEMENTS TO MYA
DAN OOF - SUMMER VACATION

 CHECK AFTER-HOURS IMPACT 
1 PERSON RESPONDED TO YOUR AFTER-HOURS EMAILS

 MATTHEW MCDERMOTT

 ADD IMPORTANT PEOPLE 
GET REMINDED OF TASKS AND UNREAD EMAILS FOR YOUR IMPORTANT PEOPLE

 JENNIFER BAYLEY + 3 OTHERS

 VIEW OUTSTANDING TASKS 
CHECK IN ON 7 SUGGESTED TASKS FROM YOUR EMAIL.

 STEVEN HODGES + 5 OTHERS

*FIG. 18*

INSIGHTS

WHAT'S NEW     JULY 1 - JULY 31

ARE YOU SURE YOU WANT TO CANCEL OOF? THIS WILL AUTOMATICALLY TURN OFF YOUR AUTO-REPLY

1920 — [ CANCEL ] [ CONTINUE ] — 1930

TRACK EMAIL OPEN RATES
CHECK HOW MANY PEOPLE OPENED YOUR RECENT SENT EMAILS

RE: FY20 IMPROVEMENTS TO MYA
DAN OOF - SUMMER VACATION

CHECK AFTER-HOURS IMPACT
1 PERSON RESPONDED TO YOUR AFTER-HOURS EMAILS

MATTHEW MCDERMOTT

ADD IMPORTANT PEOPLE
GET REMINDED OF TASKS AND UNREAD EMAILS FOR YOUR IMPORTANT PEOPLE

JENNIFER BAYLEY + 3 OTHERS

VIEW OUTSTANDING TASKS
CHECK IN ON 7 SUGGESTED TASKS FROM YOUR EMAIL.

STEVEN HODGES + 5 OTHERS

*FIG. 19*

INSIGHTS

WHAT'S NEW                    JULY 1 - JULY 31

 WELCOME BACK
HERE'S WHAT YOU NEED TO KNOW
TO CATCH UP.

| 3 UPCOMING MEETINGS | REVIEW |
| 3 UPCOMING MEETINGS | REVIEW |
| 2 PEOPLE TO CATCH UP WITH | REVIEW |

 TRACK EMAIL OPEN RATES
CHECK HOW MANY PEOPLE
OPENED YOUR RECENT SENT EMAILS

RE: FY20 IMPROVEMENTS TO MYA
DAN OOF - SUMMER VACATION

 CHECK AFTER-HOURS IMPACT
1 PERSON RESPONDED TO YOUR
AFTER-HOURS EMAILS

 MATTHEW MCDERMOTT

 ADD IMPORTANT PEOPLE
GET REMINDED OF TASKS AND
UNREAD EMAILS FOR YOUR
IMPORTANT PEOPLE

 JENNIFER BAYLEY + 3 OTHERS

 VIEW OUTSTANDING TASKS
CHECK IN ON 7 SUGGESTED
TASKS FROM YOUR EMAIL.

 STEVEN HODGES + 5 OTHERS

FIG. 20

INSIGHTS

WELCOME BACK      DISMISS ALL

---

UPCOMING MEETINGS (3)

 PRADEEP GUPTA
REAL ESTATE FACILITIES REQUES... 
9/17 10:00 AM CONF 18TH ST

 BUILDINGS LST. XLSX

---

 HENRIETTA MUELLER
RE. LOREM IPSUM DOLAR AMIT... 
9/17 3:000 PM BLDG 48/1232

---

 PRADEEP GUPTA
REAL ESTATE FACILITIES REQUES... 
9/17 10:00 AM CONF 18TH ST

 BUILDINGS LST. XLSX

---

UPCOMING MEETINGS (3)

 FOLLOW UP WITH LYNEE ROBBINS    ✕
2019 TEAM FINANCIAL RE...

2 DAYS AGO YOU SAID: "PLEASE SHARE THE FINANCIAL REPORT WITH TEAM MEMBERS BEFORE OUR TEAM MEETING ON MONDAY. THIS WILL HELP SPEED UP THE DISCUSSIONS."

[ FOLLOW UP ]

✓ DONE    ⊖ NOT A TASK      ...

---

 TASK FOR LYNEE ROBBINS
2019 TEAM FINANCIAL REQUEST... 

3 DAYS AGO YOU SAID: "I'LL REVIEW THE REPORT AND FOLLOW UP WITH YOU LATER."

[ OPEN EMAIL ]

✓ DONE    ⊖ NOT A TASK      ...

*FIG. 21A*

INTEGRATED TIME AWAY MANAGEMENT MECHANISM

BACKGROUND

Employers are recognizing, and research shows that regular periods of time away-from-work are good for employee wellbeing. Managers recognize that taking time off can renew an employee's commitment to work and can improve focus upon return. However, the fear of returning to overwhelming workloads results in discouraging employees from taking time off. The inability to disconnect reduces the benefits of time off.

Current methods of managing time away from a job involve creating an away from office message to be sent to people in response to received communications. However, to effectively manage time away, a user may also independently review their calendars and to see if any meetings might be missed and may then need to inform the meeting organizer or others that they will not be able to make the meetings that occur during their planned time away. A user may even update their electronic calendars to show that they are not available or are in a long meeting that extends for the duration of their time away.

Upon returning to work, the user may be faced with a large number of emails to go through, or the user may even spend time reviewing email while away from the office, defeating the purpose of a vacation or otherwise distracting from the reason the user is away from the office. All these different actions taken by the user involve the use of different programs, such as email, contacts management, calendar management, and task management programs, requiring the user to remember many steps to take to properly prepare for time away, as well as to catch up on return.

SUMMARY

A computer implemented method includes receiving a start date and an end date specifying a future absence or away-from-work time period for a user, generating an away from office communication specifying the away-from-work time period, retrieving via the computer a list of collaborators based on frequency and duration of recent interactions with the user, receiving via the computer a selection of collaborators from the list, identifying meetings involving the user during the away-from-work time period, generating via the computer a list of user viewable items for the user to complete prior to the away-from-work time period, and generating via the computer a list of items for the user to attend to upon return from the away-from-work time period for presentation to the user upon return.

BRIEF DESCRIPTION OF THE DRAWINGS

FIG. 1 is a user interface that may be provided as a side bar in an application user interface for planning for time away-from-work according to an example embodiment.

FIG. 9 is an example user interface illustrating selection of a decline and cancel button resulting in the selected meetings being canceled according to an example embodiment.

FIG. 15 is an example user interface illustrating a status of the time away functions according to an example embodiment.

FIG. 16 is an example user interface illustrating a status of completed tasks according to an example embodiment.

FIG. 17 is an example user interface illustrating tasks for the user upon returning from their time away according to an example embodiment.

FIG. 18 is an example user interface illustrating options presented to a user in the time away management mechanism according to an example embodiment.

FIG. 19 is an example user interface resulting from selection of a cancel button according to an example embodiment.

FIG. 20 is an example user interface illustrating options presented upon return to work according to an example embodiment.

FIGS. 21A and 21B are an example user interface illustrating and expansion of the activities according to an example embodiment.

DETAILED DESCRIPTION

Figure 2:
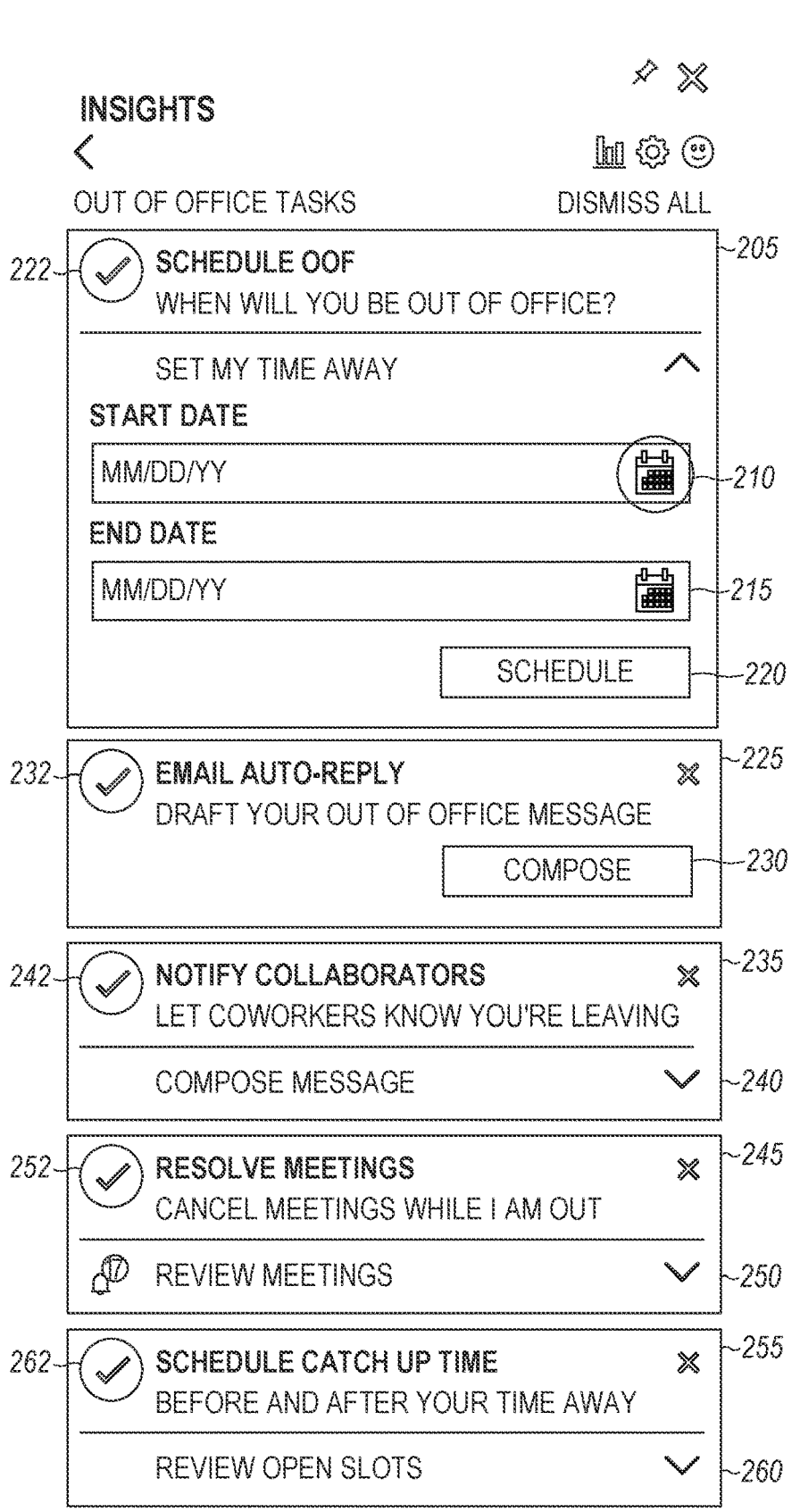
FIG. 2 is an example user interface for preparing for time away-from-work according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

To mitigate the stress associated with taking days off, especially targeting the fear of returning to overwhelming workloads and the inability to disconnect. Harvard Business Research emphasizes that the most effective vacations, in terms of reducing stress and improving mental health, are well-planned and low stress.

Embodiments of the present inventive subject matter provide a time away management mechanism that has access to workplace data and tools to help users efficiently and comprehensively prepare for absences from a workplace. The mechanism addresses multiple steps in disparate computer implemented functions to ensure that work affairs are or will be taken care of before, during, and after an absence, such as vacation, illness, or trip. The mechanism helps a user prepare for taking time off by ensuring the user is prepared before leaving for the trip, able to relax and be stress-free during the trip, and is prepared for catch up tasks after the trip.

The time away management mechanism provides an interactive checklist of tasks to complete before an absence. These tasks are based on best practices to help a user and associated team or teams to prepare for the user's time away. Although some systems have attempted to implement time away management, the features of these systems are disconnected and separately initiated by the user, leading to ineffective and inconsistent use as well as difficulty in using. In contrast, the present time away management mechanism may be personalized to the user and their collaboration habits.

The time away management mechanism provides an autogenerated auto-reply message based on the dates the user will be away-from-work, and a list of people to notify of the user's upcoming absence, allowing the user to send an email or other notification to these people all in one click. In addition, a list of meetings is provided that will take place while the user is gone, allowing the user to decline/cancel selected meetings or all meetings in one click. These functions are provided by a single and consistent user interface without the need to initiate functions in disparate email and calendar functions.

Upon return from an absence or other time away-from-work, the user is provided a curated, summarized list of the most important things for the user to know. The list may include upcoming meetings and their pre-reads, tasks that are due, and recommendations of collaborators who can help the user catch up on what was missed.

A user interface is first described followed by details regarding implementation of the functions available via the user interface.

FIG. 1 is an example user interface 100 that may be provided as a side bar in an application user interface, such as that provided by Microsoft Office. A side bar is a visible box or series of boxes placed in a user interface that provides access to functions. In this case, the side bar provides access to additional functions provided to one or more add-ins to an office management application. The additional functions include functions related to managing time away-from-work. Other aspects of the application user interface are not shown for simplicity, but may include email, tasks, contacts, calendar, and other functions that may or may not be integrated together. In one embodiment, user interface 100 is provided by an add-in program, such as Microsoft Insights, which may be operated in some examples as an add-in program within an application that provides email, tasks, contacts, calendar or similar functions. Insights may be thought of as a program that monitors and analyzes user interactions. Insights may include many different functions, such as the current inventive subject matter corresponding to time away interface element 110, as well as tracking of email open rates 125, checking after-hours impact 130, suggestions to add important people 135 for being reminded of tasks and unread emails from important people, and viewing of outstanding tasks 140.

Time away functions that are instantiated by the user selecting time away interface element 110, as indicated by the circle in FIG. 1. Note that such circles around elements are used in the figures to indicate selection of the user interface element. The time away functions may make use of data that is aggregated for use by the other functions such as Microsoft MyAnalytics. The aggregated data may include for instance important people, meetings, frequency of communications, and other data that is helpful in planning to be away-from-work.

Interface 100 may take other forms for the user to interact with for scheduling time away-from-work. Time away-from-work interface element 110 may appear alone as an icon or may be presented in response to a user trying to use a prior out-of-office function. In still further embodiments, interface element 110 or other means of intelligently scheduling time away may appear as a suggestion to a user in response to the user not having scheduled time away for a long period of time, or in response to a lack of planned activity noted by insight analysis.

FIG. 2 is an example user interface 200 for intelligently and comprehensively preparing for time away-from-work. The various interfaces shown in the figures may be referred to as cards. Cards contain data presented to the user as well as interface elements for providing more data and for selecting functions to perform via icons, buttons, checkboxes, and other common user interface constructs.

Interface 200 may appear in response to the user having selected interface element 110 may be selected via a different mechanism. Interface 200 provides a list of interface elements for functions for the user to use to prepare for an absence. Further user interfaces may be generated based on selection of interface elements as shown in succeeding figures. A time away function 205 includes fields to specify a start date 210 and an end date 215, either by typing in the dates or selecting them from a calendar window or popup. Selecting a schedule button 220 commits the selected dates to storage, referred to as a time away record, for use in further functions. A check circle 222 is used to show completion of the selection of dates.

At 225, an email auto-reply may be selected via a compose button 230. A check circle 232 is provided to show completion of the email auto-reply function.

A next step in the away-from-work preparation may include selection of a notify collaborators function 235 to let coworkers and other colleagues know that the user will be gone for the selected period of time. A user interface element 240 may be selected to compose a message to the collaborators to notify them of the user's upcoming absence. Check circle 242 may be used to indicated completion.

Meetings occurring during the period of absence may be resolved at 245. Cancellations for such meetings may be automatically sent. Such meetings may be reviewed and selected via user interface element 250. Upon completion of dealing with such meetings, a check circle 252 may be automatically checked.

Time both before and after the absence may be scheduled as indicated at 255, along with open time slots via interface element 260. Upon completion, check circle 262 may be checked.

The check circles or squares, or other means of indicating completion of functions may be used, providing a list for tracking progress in preparing for time away. Note that the term "OOF" corresponding to out of office may appear and is consistent with the phrase "away-from-work." Work may be performed in an office or from home, or other normal place of work. The word "work" may also correspond to activities or a role in a company, activities or a role in a non-profit, or for any activity or role where the user may be away for a period of time.

Figure 3:
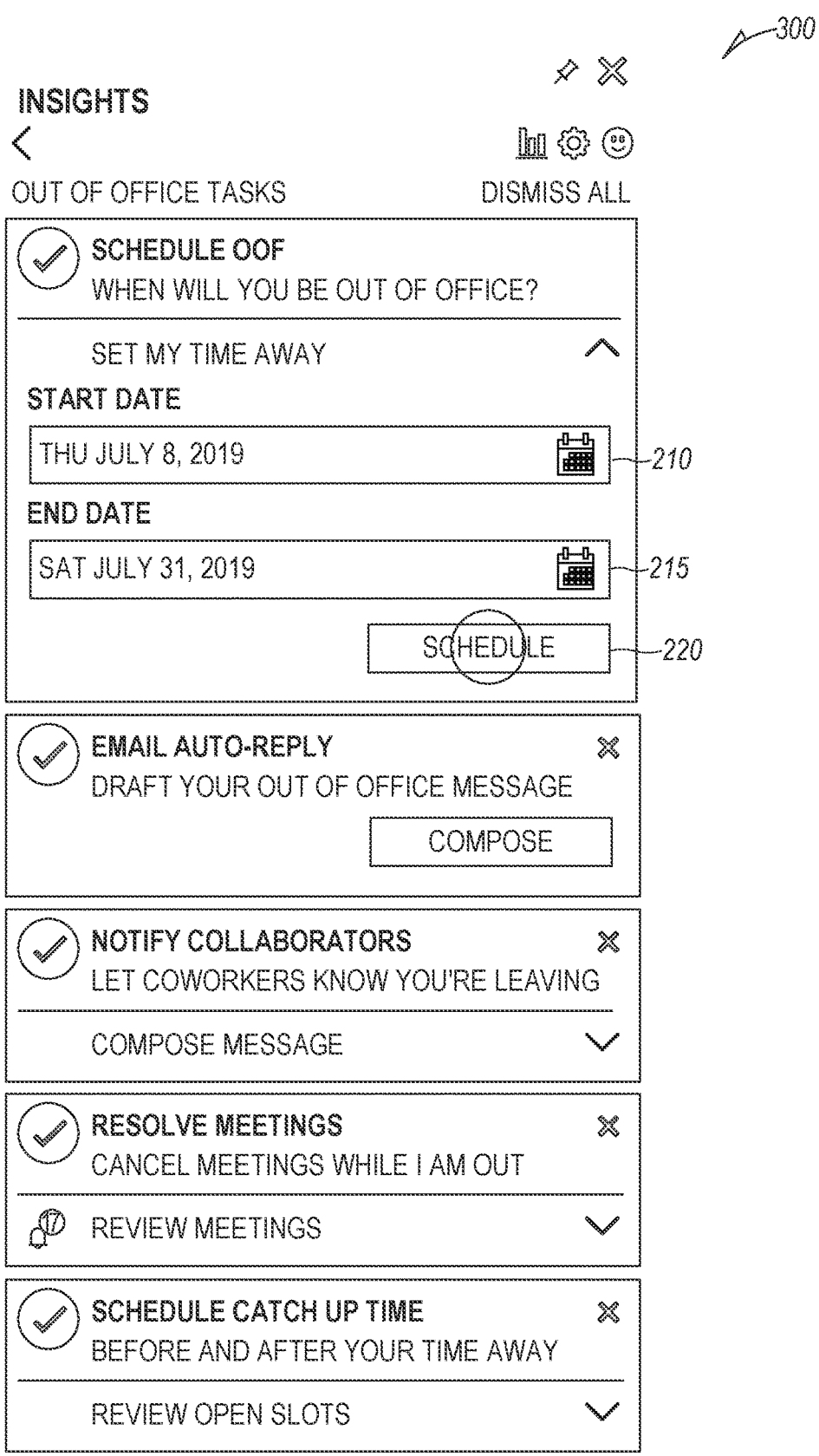
FIG. 3 is an example user interface illustrating selection of dates for time away according to an example embodiment.

FIG. 3 is an example user interface 300 illustrating selection of dates upon selection of the schedule button 220. Thursday Jul. 8, 2019 has been selected as the start date, with Saturday Jul. 31, 2019 selected as the return date.

Figure 4:
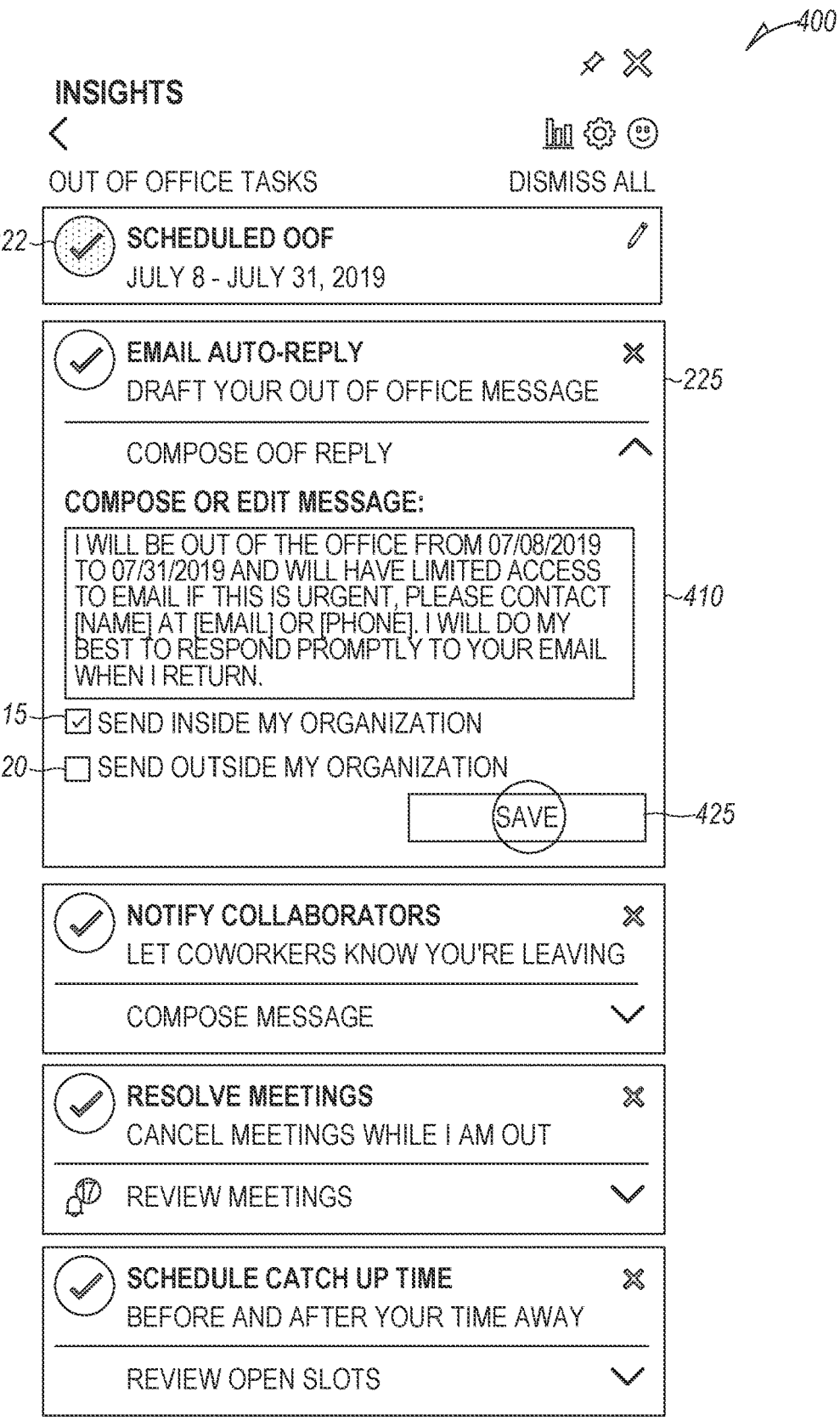
FIG. 4 is an example user interface illustrating further details for selecting an email auto-reply according to an example embodiment.

FIG. 4 is an example user interface 400 illustrating further details for selecting an email auto-reply 225. An automatically composed email is shown at 410 with the dates of absence automatically filled in from the dates saved in the time away record. Placeholders may include a name, email, and phone number of a person to contact during the absence. Standard checkboxes 415 and 420 are provided for sending the email inside and outside an organization. Note that the email may be unique or the same for both options. Also, given the sequence of figures illustrating progression through the OOF functions, circle 222 has been checked to illustrate that the dates have been selected and saved. A save button 425 is selectable to save the results.

Figure 5:
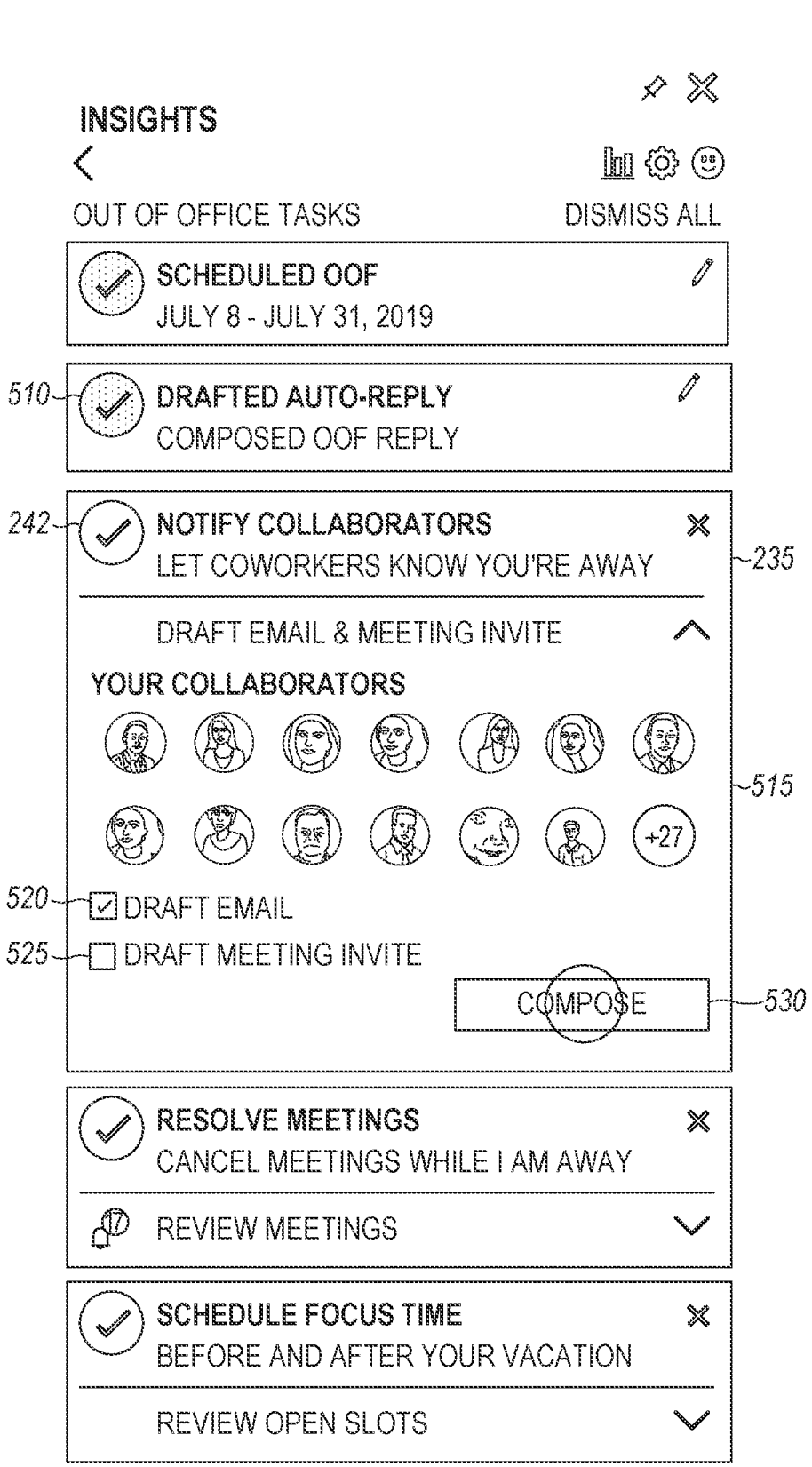
FIG. 5 is an example user interface illustrating the notification of collaborators according to an example embodiment.

FIG. 5 is an example user interface 500 illustrating the notification of collaborators. Note that since an auto-reply has been drafted pursuant to interaction with interface 400, a drafted auto-reply circle 510 has been checked. Upon selection of the notify collaborators function 235, a list of collaborators 515 is shown. A draft email checkbox is shown as checked at 520, and a meeting invite checkbox is not shown as checked at 525. A compose button 530 is shown as being selected by the user.

Figure 6:
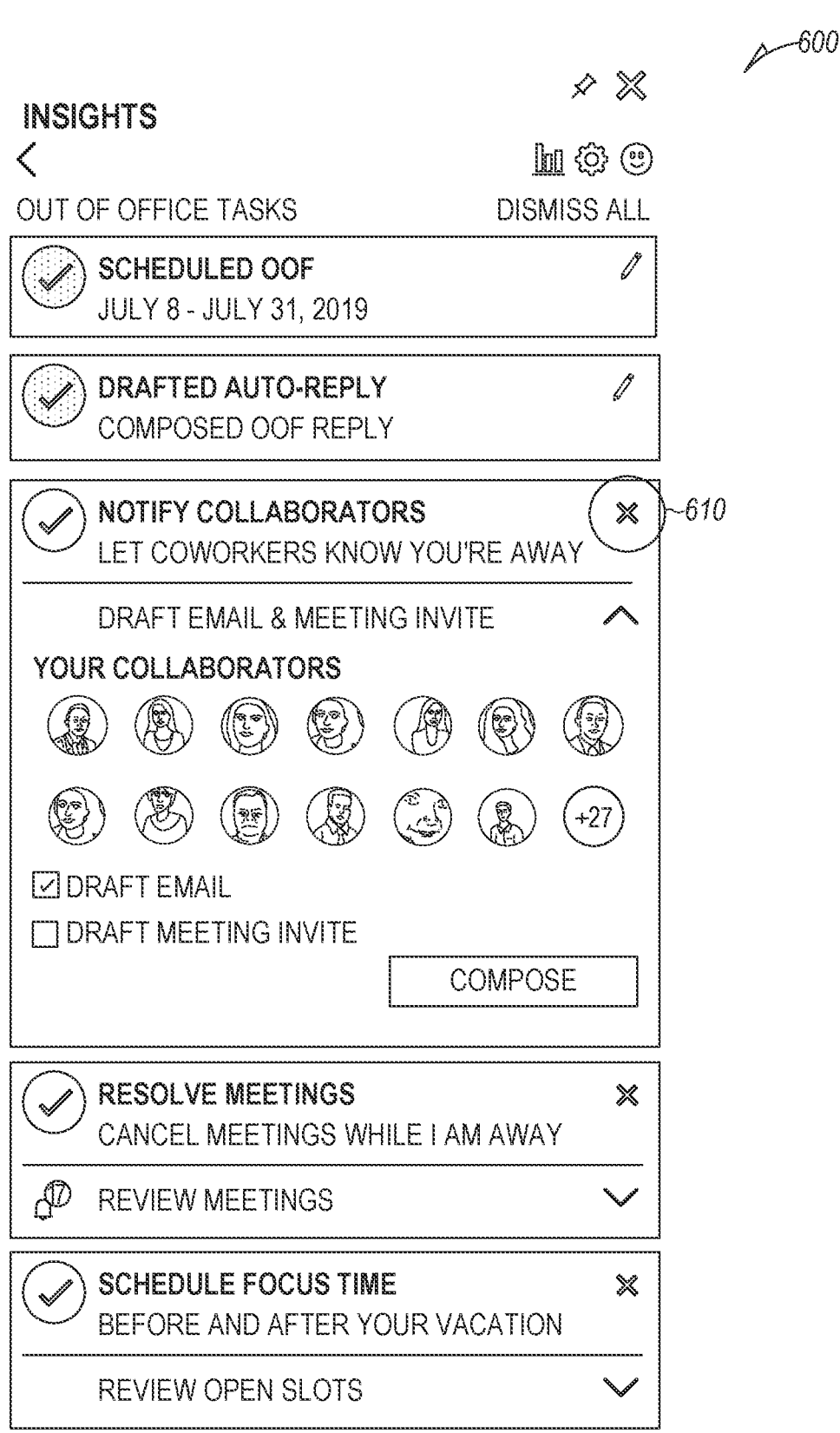
FIG. 6 is an example user interface in response to selection of a compose button according to an example embodiment.

FIG. 6 is an example user interface 600 in response to selection of the compose button 530. A cancel button 610 is shown as being selected.

Figure 7:
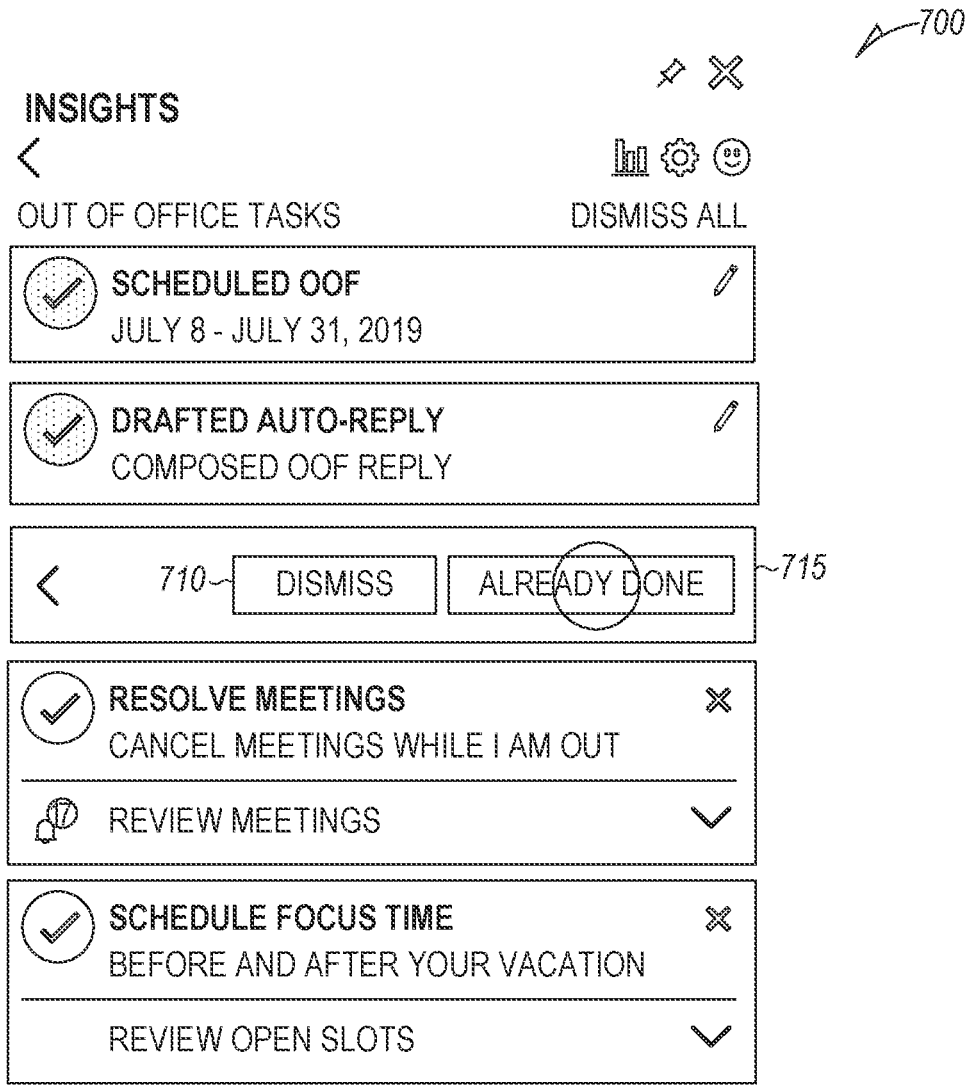
FIG. 7 is an example user interface in response to selection of a cancel button according to an example embodiment.

FIG. 7 is an example user interface 700 in response to selection of the cancel button 610. A dismiss button is shown at 710, and an already done button 715 is shown as being selected. Button 715 may be selected in response to the auto-reply being previously composed and ready to be used.

Figure 8:
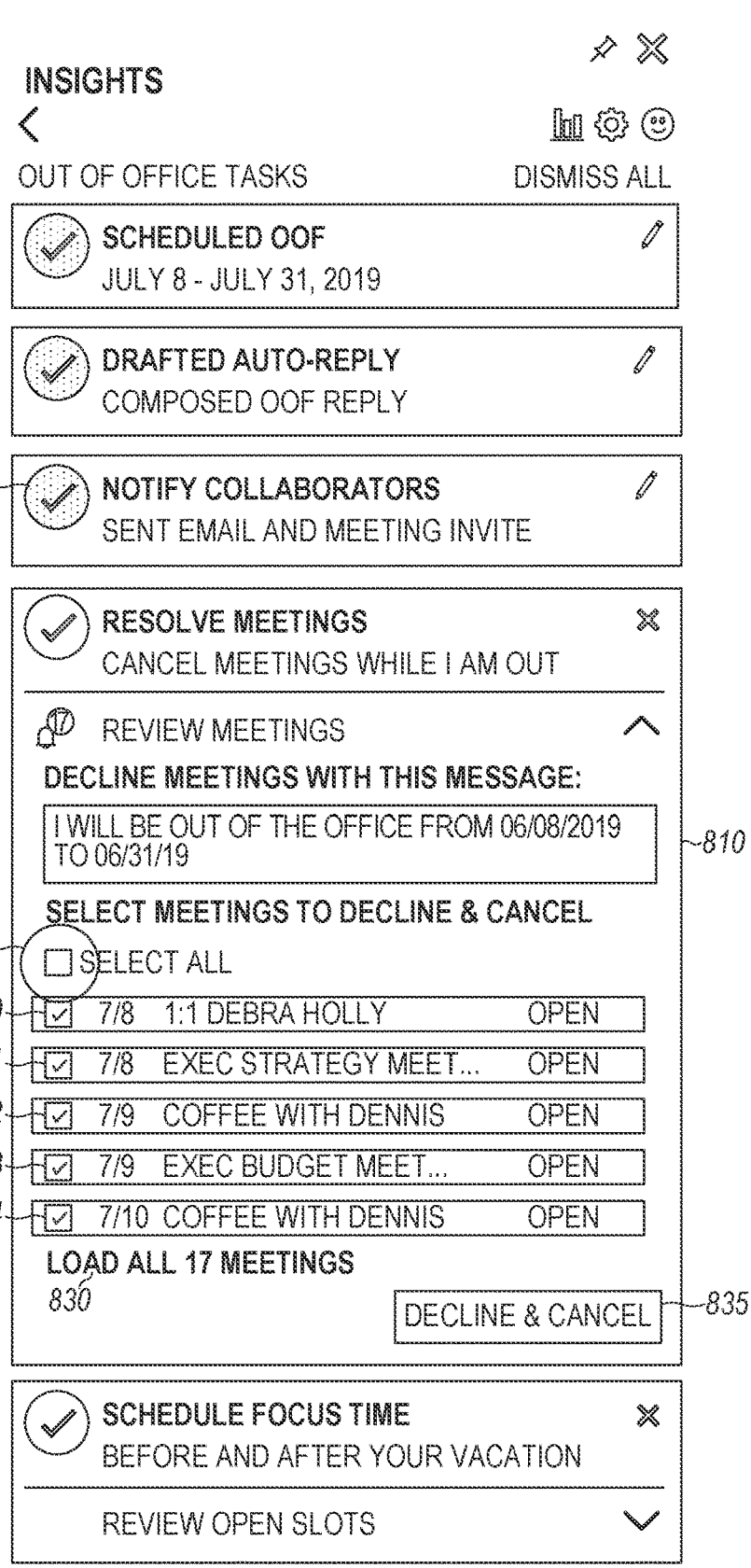
FIG. 8 is an example user interface in response to selection of a review meetings element according to an example embodiment.

FIG. 8 is an example user interface 800 in response to selection of the review meetings element 250. An editable prefilled away message 810 may be sent for selected meetings to automatically decline the meetings. A select all checkbox 815 may be selected to apply this action to all meetings. Otherwise, individual checkboxes 820, 821, 822, 823, and 824 may be individually selected to apply this action for specific meetings that are occurring during the away period. More meetings occurring may be displayed for selection via element 830, which shows there are 17 meetings occurring during the away period. A user may select to decline and cancel the selected meetings at 835. Section at 835 cancels the selected meetings during the away period.

FIG. 9 is an example user interface 900 illustrating selection of a decline and cancel button 930 resulting in the selected meetings being canceled. The selected meetings include all the meetings as indicated by the checked checkboxes 915, 920, 921, 922, 923, and 924.

Figure 10:
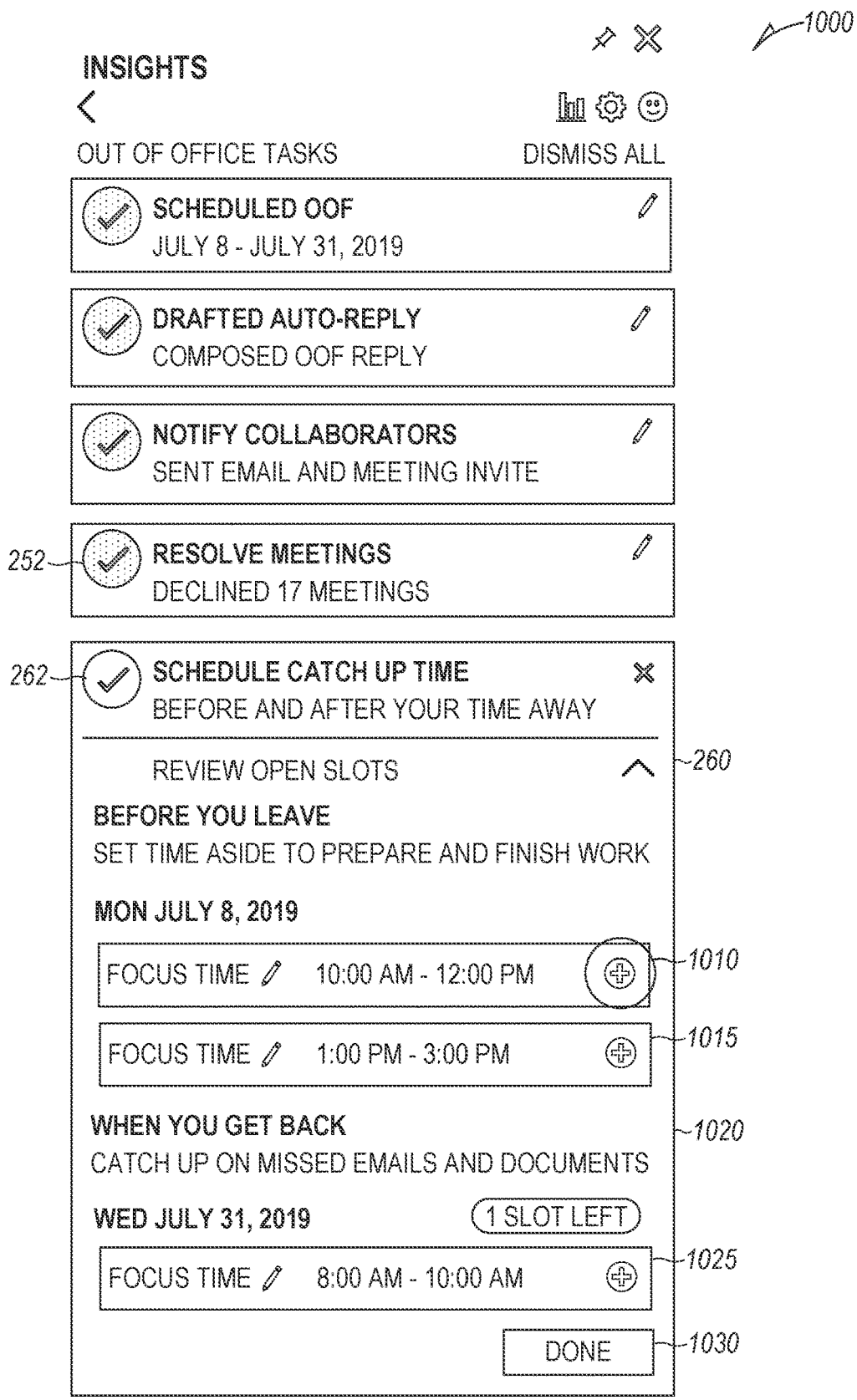
FIG. 10 is an example user interface illustrating that a circle has been checked corresponding to all meetings have been resolved in response to decline and cancel button having been previously selected according to an example embodiment.

FIG. 10 is an example user interface 1000 illustrating that circle 252 has been checked corresponding to all meetings have been resolved in response to decline and cancel button 930 having been previously selected. The review open slots function 260 is shown open with a few focus times 1010 and 1015 shown as available before leaving. Time 1010 is shown as being selected. Also shown is an upon return section 1020 showing focus time slot 1025 on Jul. 31, 2019. A done button 1030 may be selected to add calendar entries corresponding to the slots selected.

Figure 11:
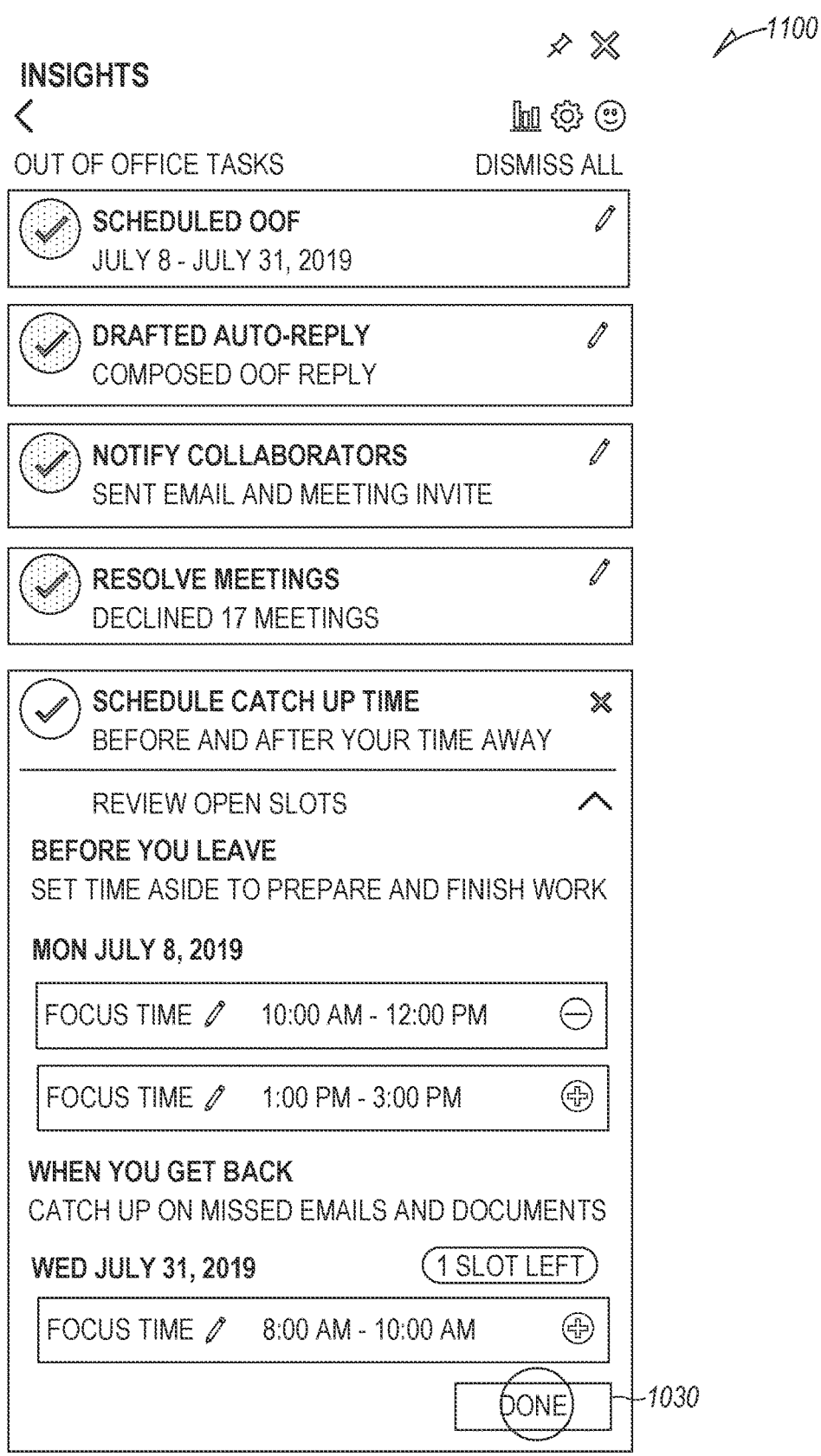
FIG. 11 is an example user interface illustrating selection of the done button according to an example embodiment.

FIG. 11 is an example user interface 1100 illustrating selection of the done button 1030.

Figure 12:
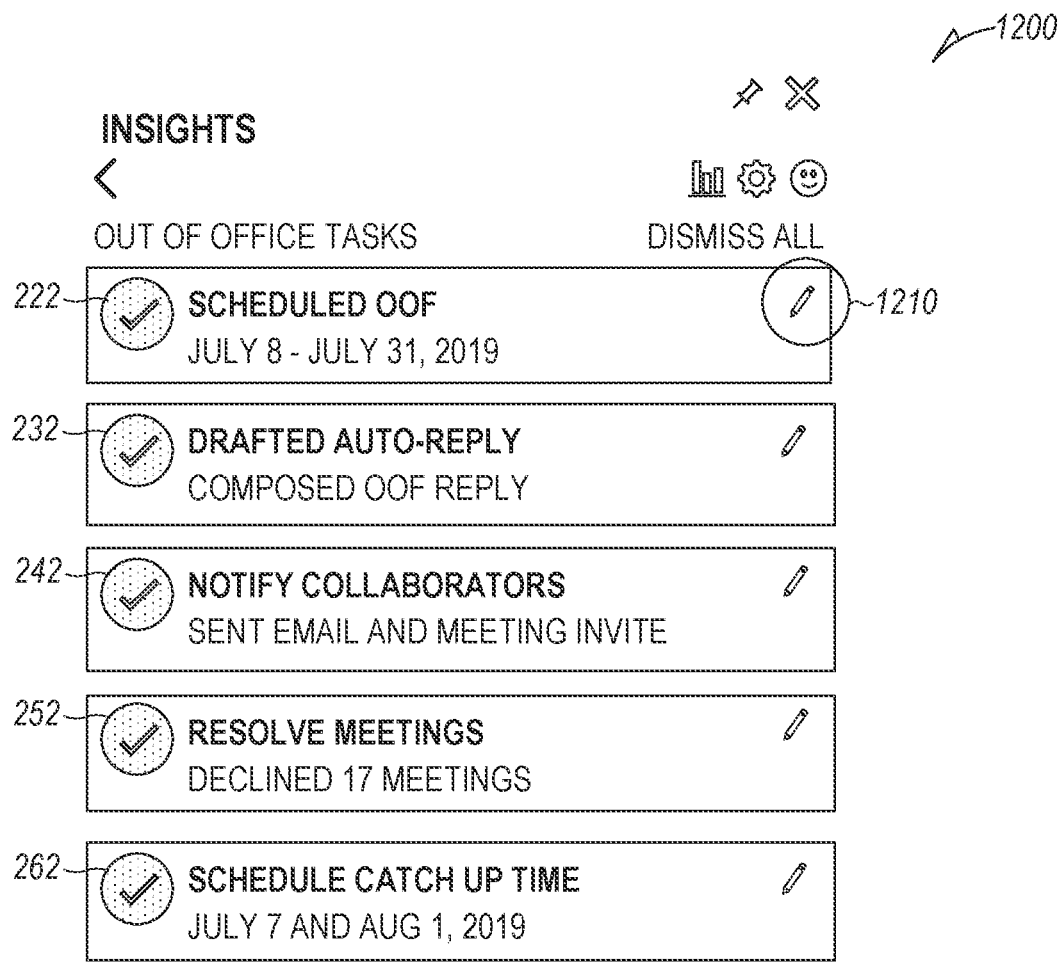
FIG. 12 is an example user interface illustrating a list of pre-absence functions that have been completed via checked circles according to an example embodiment.

FIG. 12 is an example user interface 1200 illustrating a list of all the pre absence functions that have been completed via checked circles 222, 232, 242, 252, and 262, providing a visual confirmation that tasks have been successfully completed prior to the planned absence in one easy to view interface. Each function has an edit button, with button 1210 shown as being selected for the overall scheduled time away function 205.

Figure 13:
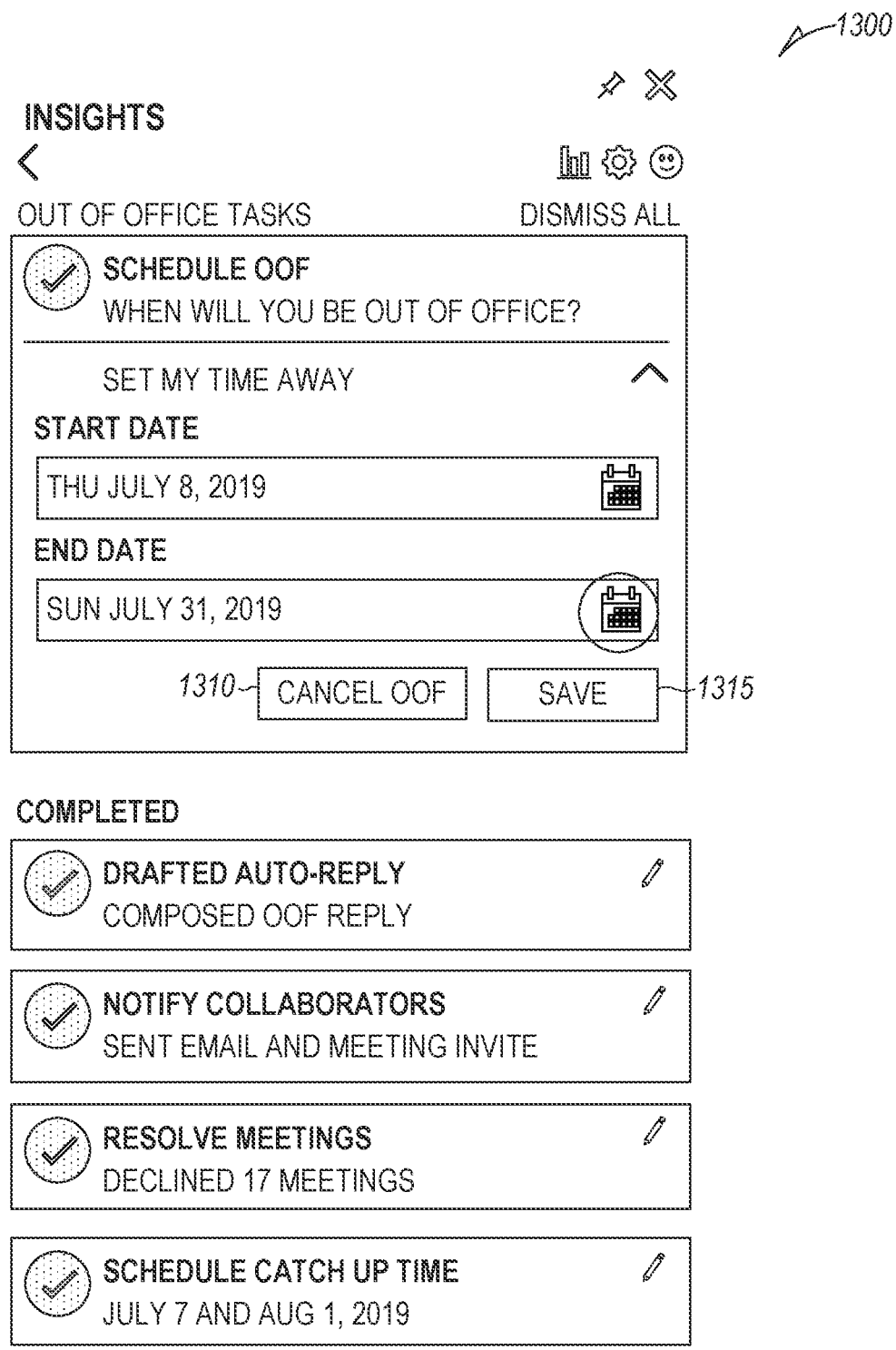
FIG. 13 is an example user interface illustrating editing of the time away according to an example embodiment.

FIG. 13 is an example user interface 1300 is displayed upon selecting button 1210, allowing editing of the time away. The times may be edited at 210 and 215. The time away may also be canceled at button 1310 or the edited times saved at button 1315. Editing the time away may cascade down the functions, resulting in a new away from office email and a new email to collaborators which may be optionally sent. Other functions may also be affected, such as tasks and meetings, and even the scheduled focus and catch up times both before leaving and on return.

Figure 14:
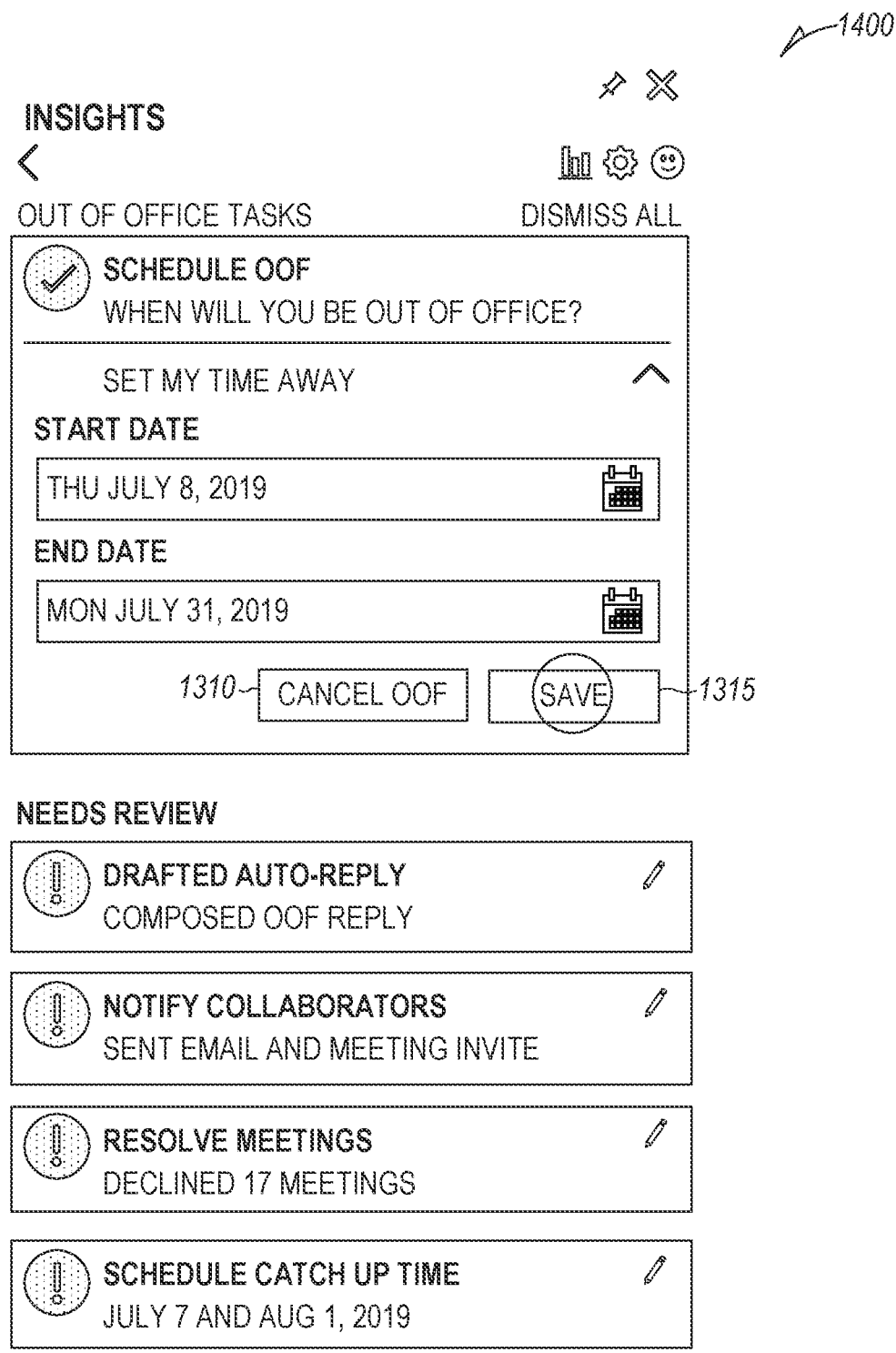
FIG. 14 is an example user interface illustrating selection of a save button according to an example embodiment.

FIG. 14 is an example user interface 1400 illustrating selection of the save button 1315.

Figure 15:
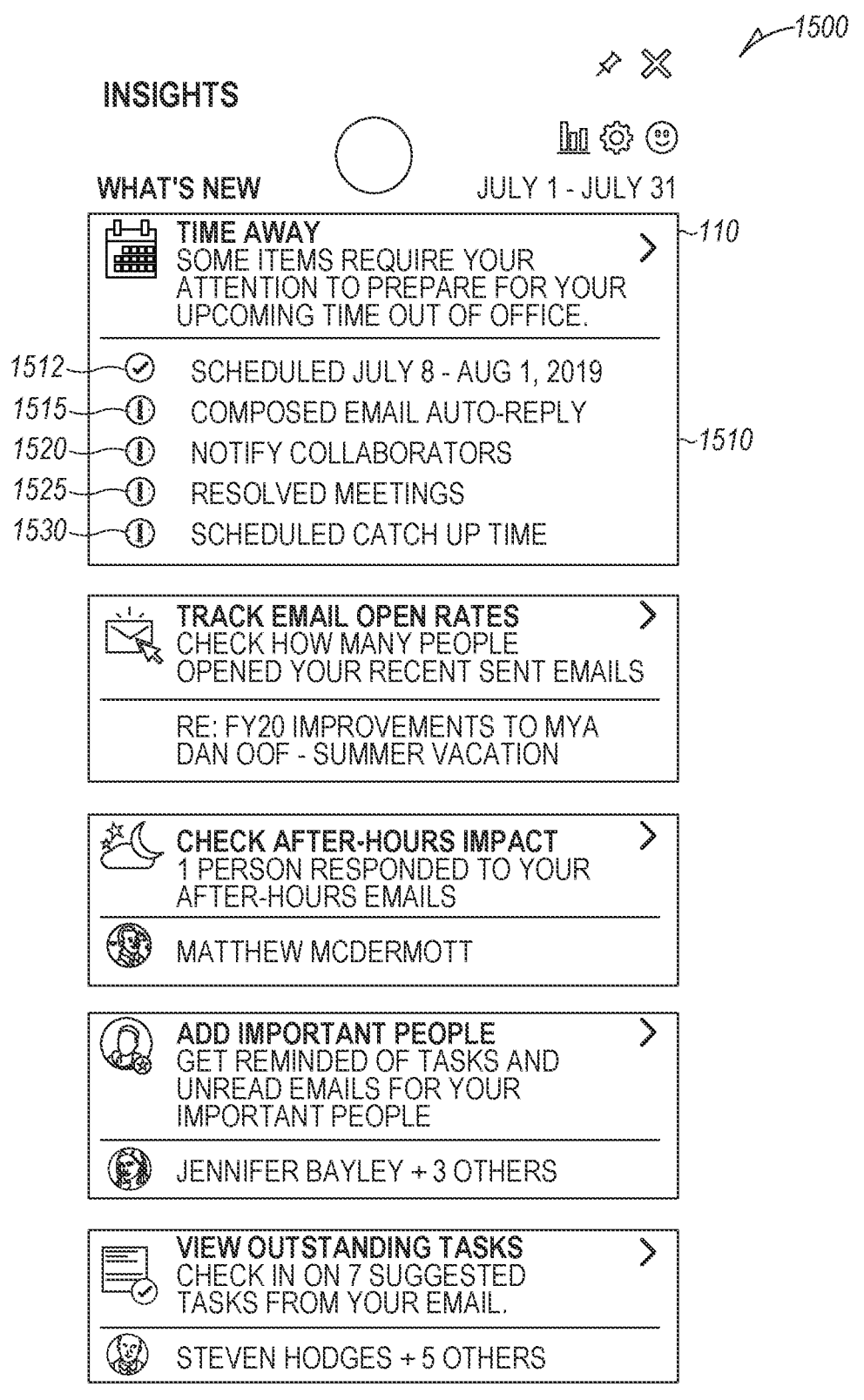

FIG. 15 is an example user interface 1500 illustrating a status 1510 of the time away functions. The status 1510 shows that the scheduled time is properly entered at 1512. However, four time away tasks have not been completed, including composition of the email reply at 1515, notifying collaborators at 1520, resolving meetings at 1525, and scheduling catch up time 1530. The indication of non-completion is an exclamation point, which a check mark is used to show proper completion.

FIG. 16 is an example user interface 1600 illustrating a status 1610 that all tasks have been completed in preparation of time away as indicated at 1615 with all circles having checkmarks.

FIG. 17 is an example user interface 1700 illustrating tasks for the user upon returning from their time away. At 1710, the user is greeted with a welcome back message that includes a list of tasks 1720 including for example, reading the most important emails, catching up with top collaborators, reviewing the latest shared documents, scheduling catch up time, and reviewing activity that occurred while the user was away.

FIG. 18 is an example user interface 1800 illustrating options presented should a user access a computer with access to the time away management mechanism. At 1810, a message is presented informing the user that the OOF or away from office functionality is currently active. The user is provided an edit settings button 1820 and a cancel OOF button 1830.

FIG. 19 is an example user interface 1900 resulting from selection of the cancel OOF button 1830. A message is presented to the user at 1910 asking if the user is sure they wish to cancel, with cancel button 1920 and continue button 1930 for confirmation options.

FIG. 20 is an example user interface 2000 illustrating options presented upon return to work including a summary 2010 of activities to perform. An upcoming meetings button 2020, an upcoming tasks button 2030, and people to catch up with button 2040 may be select to see corresponding details.

Figure 21B:

FIGS. 21A and 21B are an example user interface 2100 illustrating and expansion of the activities resulting from selection of the buttons 2020, 2030, and 2040. FIG. 21B is a continuation of FIG. 21A to be placed directly beneath FIG. 21A for viewing. The meetings may have links to documents relevant to the meetings as well as options to view in a calendar. Options are provided for the tasks to indicate they are done, identify them as not a task, and to indicate that follow up is selected. People to follow up with may have a calendar icon for use in scheduling times with each as desired. Thus, in one spot, the user is provided with a list of activities to perform to help them catch up with people and projects. The list may help relieve the stress of returning to work and provide a conveniently viewable path to full and refreshed productivity.

In one embodiment the time away management mechanism may be implemented as an Outlook add-in card that will serve as the entry point for the series of OOF preparation tasks on the main menu. This card may be persistent, so users can click into and edit any of the action items at any time. After the user completes the first required OOF scheduling card, a checklist 1510 will appear on this main menu card. Completing each individual task should automatically change the color of the respective checkmark to green. After the vacation dates pass, user will be presented with the post-vacation card 2000.

Figure 22:
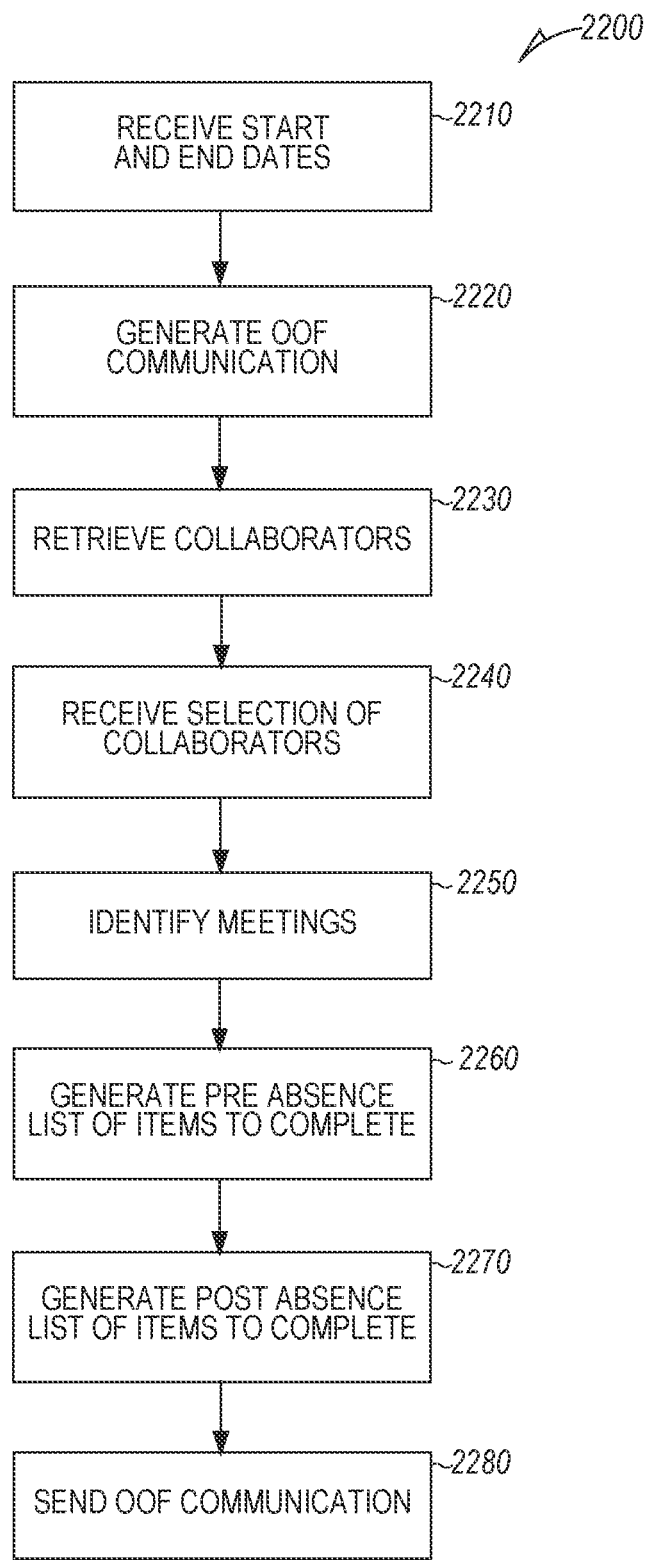
FIG. 22 is a flowchart illustrating a computer implemented method of planning and effecting a plan for an absence from work according to an example embodiment.

FIG. 22 is a flowchart illustrating a computer implemented method 2200 of planning and effecting a plan for an absence from work. At operation 2210 a start date and an end date are received from a user interacting with an absence management user interface. The dates specify a future absence from work time period for a user. An away from office communication specifying the away from office time period is generated at operation 2220. The computer retrieves at operation 2230 a list of collaborators based on frequency and duration of recent interactions with the user. The list of collaborators may be retrieved from a data store containing aggregations of previously monitored user interactions with collaborators, including email and meeting notices.

At operation 2240, the computer receives a selection of collaborators from the list via user interaction with the absence management user interface. The computer then performs operation 2250 to identify meetings involving the user during the away from office time period. At operation 2260, the computer generates a list of items for the user to complete prior to the away from office time period. The computer then performs operation 2270 to generate a list of items for the user to attend to upon return from the away from office time period. The computer may also send the away from office communication to the selected collaborators at operation 2280.

Operation 2240 may also include identifying a contact for each identified meeting and informing each such contact of the user's being away from the office.

Upon the time period passing, usually corresponding with return of the user, operation 2270 may identify documents associated with the list of items for the user to attend to upon return from the away from office time period. The documents may be identified based on at least one of documents attached to meeting notices for meeting occurring during the away from office time period, documents attached to replies to such meeting notices, and documents having similar titles, recipients, and in similar threads that the user is associated with.

The generated list of items for the user to attend to upon return may include a suggested meeting with a selected collaborator based on prior frequency and length of interactions. The frequency and length of interactions may include one or more of email between the user and the selected collaborator, length of threads between the user and the selected collaborator, and frequency of meetings including the user and the selected collaborator.

In some embodiments, a user may wish to schedule multiple future times away. Each may be identified by the dates specified. The user may wish to update each time away period as that period approaches to include the consideration of additional meetings and tasks that may have been requested or generated prior to the time away period occurring. The user may also specify that if all meetings were selected (e.g., selected with checkbox 915) for each time away period, the meetings will be declined as they occur. If not, the user may be presented with the option of declining the meetings as they are being set up, or at a user selected time while updating the time away period in which the meeting was attempted to be scheduled.

Figure 23:
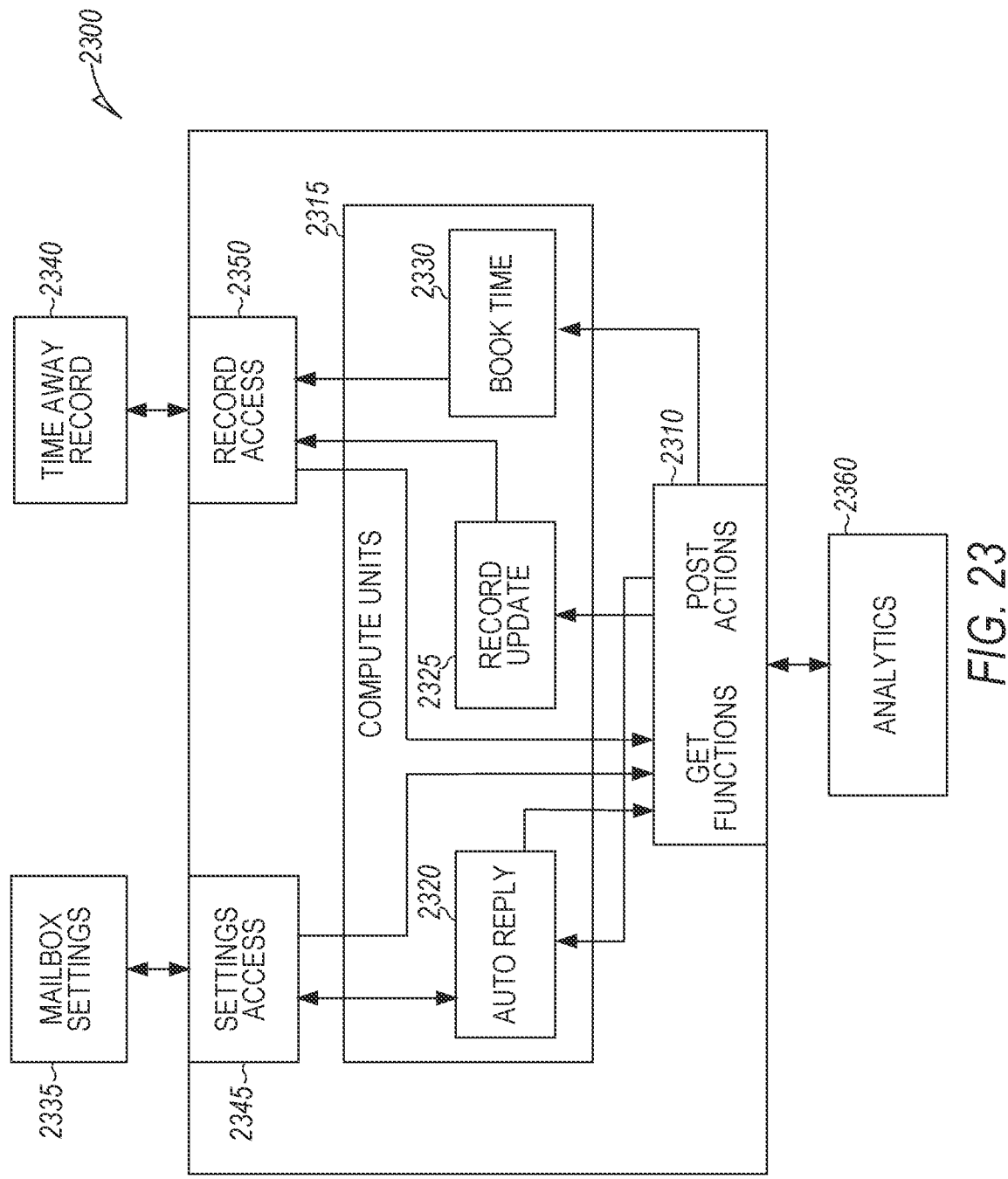
FIG. 23 is a block flow diagram of an add-in for an office management system according to an example embodiment.

FIG. 23 is a block flow diagram of an add-in 2300 for an office management system such as Microsoft Outlook. A new resource called TimeAwayRecords is shown at 2310 and executed by module 2315. modules include autoreply 2320, record update 2325, and book time 2330. The modules 2315 have access to mailbox settings 2335 and time away record 2340. The mailbox settings contain data related to out of office replies, emails, and other information related to mailbox functions. The time away record 2340 records information collected via the time away management mechanism interfaces and to display back to users regarding choices made to manage a planned time away-from-work. A settings accessor 2345 is used to access the mailbox settings for autoreplies, and a record store accessor 2350 is used to access time away records 2340. module 2310 supports GET methods and POST methods to access information generated by an analytics engine 2360, such as MyAnalytics running on a Microsoft Azure platform. Engine 2360 provides aggregated data from user interactions with the office management system which is viewable via interface elements 125, 130, 135, and 140. The engine 2360 has access to calendar, task, and mailbox data for use in generating the information used by the time away insight.

TimeAwayRecords 2310 includes a GET resource function that accesses the analytics engine 2360 and also includes several post actions, including POST book time away duration action, POST update time away record action, and POST set autoreply action. Each of these actions works through the respective autoreply 2320, record update 2325, and book time 2330 compute units, which in turn access the mailbox settings 2335 and time away record 2340 to store the corresponding data. The module 2315 access the data to use the GET and POST actions to both get data generated by the analytics engine 2360 and ensure that the data is posted to the interfaces described above to allow informed user interaction while planning time away.

TimeAwayPreparationInsight 2310 also includes a GET ImportantContactExtension function to access important contacts generated by the analytics engine 2360.

By calling the GET insight function, three actions may be performed:
BookTimeAwayDurationAction, to new a time away record in an internal data storage service referred to as SDS.
UpdateTimeAwayRecordAction, to update one property within the time away record.
SetAutoReplyAction, to set email autoreply during time away duration.

The following section provides implementation details for generating user interfaces, storing data, and interacting functions to generate data for storing and for interacting with the time away management mechanism. An example application programming interface (API) schema of the GET insight response may be represented in pseudocode as:

```
[{
  "TimeAwayRecordId": "XXX",
  "TimeAwayStartTime": "2019-10-25T00:00:00Z"
  "TimeAwayEndTime": "2019-10-29T00:00:00Z",
  "TimeAwayType": "UserBooked",
  "Preparation": {
    "SetAutoReplyStatus": "NotCompleted",
    "NotifyContactsStatus": "NotCompleted",
    "ResolveMeetingsStatus": "NotCompleted",
    "ScheduleCatchUpTimeStatus": "NotCompleted"
  },
  "CatchUp": {
    "CatchUpEmails": "NotCompleted",
    "CatchUpContacts": "NotCompleted",
    "ReviewDocuments": "NotCompleted",
    "ReviewActivity": "NotCompleted",
  }
}]
```

The post action details are now described:
BookTimeAwayDurationAction

```
{
  "TimeAwayStartTime": "2019-10-25T00:00:00Z"
  "TimeAwayEndTime": "2019-10-29T00:00:00Z",
}
    UpdateTimeAwayRecordAction
{
  "Preparation": {
    "NotifyContactsStatus": "NotCompleted",
  }
}
```

SetAutoReplyAction

```
{
  "Status": "Scheduled",
  "ExternalAudience": "None",
  "InternalReplyMessage": "Feng is OOF",
  "ExternalReplyMessage": "",
  "ScheduledStartDateTime": {
    "DateTime": "2019-08-13T08:00:00.0000000"
    "TimeZone": "UTC"
  },
  "ScheduledEndDateTime": {
    "DateTime": "2019-08-14T08:00:00.0000000"
    "TimeZone": "UTC"
  }
}
```

Response:

```
{
  "TimeAwayRecordId": "XXX",
  "TimeAwayStartTime": "2019-10-25T00:00:00Z",
  "TimeAwayEndTime": "2019-10-29T00:00:00Z",
  "TimeAwayType": "UserBooked",
  "Preparation": {
    "SetAutoReplyStatus": "NotCompleted",
    "NotifyContactsStatus": "NotCompleted",
    "ResolveMeetingsStatus": "NotCompleted",
    "ScheduleCatchUpTimeStatus": "NotCompleted"
  },
  "CatchUp": {
    "Catch UpEmails": "NotCompleted",
    "Catch UpContacts": "NotCompleted",
    "ReviewDocuments": "NotCompleted",
    "ReviewActivity": "NotCompleted",
  }
}
```

```
{
    "TimeAwayRecordId": "DefaultTimeAwayRecordId",
    " TimeAwayRecordId @type": "Edm.String",
    "TimeAwayStartTime": "2019-10-12T00:00:00Z",
    "TimeAwayStartTime@type": "Edm.DateTimeOffset",
    "TimeAwayEndTime": "2019-10-13T00:00:00Z",
    "TimeAwayEndTime@type": "Edm.DateTimeOffset",
    "TimeAwayType": "UserBooked",
    "TimeAwayEndTime@type": "Edm.String",
    "Preparation": {
       "SetAutoReplyStatus": "NotCompleted",
       "SetAutoReplyStatus@type": "Edm.String",
       "NotifyContactsStatus": "NotCompleted",
       "NotifyContactsStatus@type": "Edm.String",
       "ResolveMeetingsStatus": "NotCompleted",
       "ResolveMeetingsStatus@type": "Edm.String",
       "ScheduleCatchUpTimeStatus": "NotCompleted",
       "ScheduleCatchUpTimeStatus@type": "Edm.String"
    },
    "CatchUp": {
       "CatchUpEmails": "NotCompleted",
       "CatchUpEmails@type": "Edm.String ",
       "CatchUpContacts": "NotCompleted",
       "CatchUpContacts@type": "Edm.String",
       "ReviewDocuments": "NotCompleted",
       "ReviewDocuments@type": "Edm.String",
       "ReviewActivity": "NotCompleted",
       "ReviewActivity@type": "Edm.String"
    }
}
```

The time away record 2340 stores data in accordance with the following schema in one embodiment:

```
{
   "TypeName@Is.Queryable":true,
   "TypeName":"TimeAwayRecord",
   "TypeName@type":"Edm.String",
   "SerializedJsonData":
   {
      "StartTime":"2019-09-01T00:00:00Z",
      "EndTime":"2019-09-04T00:00:00Z",
      "TimeAwayRecordId":"XXX",
      "Preparations"
      [
         {"PreparatoryTaskName":"NotifyContacts","PreparatoryTaskStatus":"Done"},
         {"PreparatoryTaskName":"SetAutoReply","PreparatoryTaskStatus":"Done"},
         {"PreparatoryTaskName":"ResolveMeetings","PreparatoryTaskStatus":"Done"}
      ]
   },
   ...
   "#type.TypeName":"String"
}
```

The analytics engine 2360 creates a back-end insight which is converted to front end insight by TimeAwayPreparationInsight compute unit 2312, which contains a converter to convert the insight instance. The converted insight instance:

```
interface ITimeAwayPreparationInsightInstance extends IInstanceData {
   TimeAwayRecordIdentifier: string;
   StartTime: Date;
   EndTime: Date;
   TaskNameToStatus: Dictionary<string>;
   AutoReplySettings: IAutoReplySettings;
}
```

Then the insight is dispatched to TimeAwayPreparationStore 2340, there is a process method to convert this insight to TimeAwayPreparatoryState:

```
@doop export class TimeAwayPreparationState extends
CachedDataStreamStoreBase<IState> {
   ...
   @doop get timeAwayRecordId( ) { return doop<string, this>( ) }
   @doop get scheduledVacationDuration( ) { return
   doop<IVacationDuration, this>( ) }
   @doop get autoReplySettings( ) { return
   doop<IAutoReplySettings, this>( ); }
   @doop get notifyContactsStatus( ) { return
   doop<PreparationStatus, this>( ); }
   @doop get resolveMeetingsStatus( ) { return
   doop<PreparationStatus, this>( ); }
   @doop get setAutoReplySettingsStatus( ) { return
   doop<PreparationStatus, this>( ); }
   public toJSON( ): IState {...}
   public fromJSON(parsedValue: IState) {...}
}
```

The time away preparation store 2340 and time away preparation state are used to handle time away preparation actions. The store keeps the preparation state and has 4 action call-backs.

```
class TimeawayPreparationStore
extends CachedDataStreamStoreBase<IState,
TimeawayPreparationState> {
   constructor( ) {...}
   public processUpdateTimeAwayRecordAction(state:
   TimeawayPreparationState): TimeawayPreparationState {...}
   public processBookTimeAwayDurationAction(state:
   TimeawayPreparationState): TimeawayPreparationState {...}
```

-continued

```
   public processSetAutoReplyAction(state: TimeawayPreparationState):
   TimeawayPreparationState {...}
   public processTimeAwayInsights(state: TimeawayPreparationState):
   TimeawayPreparationState {...}
}
```

The "processTimeAwayInsights" is used to dispatch the time away insight into this store, other 3 methods are to handle users' time away preparation actions.

The auto reply settings interface has similar schema of mailbox settings API:

```
interface IAutoReplySettings {
   status: PreparationStatus;
   externalAudience: AutoReplyExternalAudience;
```

-continued

```
scheduledStartDateTime: Date;
scheduledEndDateTime: Date;
internalReplyMessage: string;
externalReplyMessage: string;
}
```

The PreparationStatus is an enum with 5 values:

```
export enum PreparationStatus{
None,
NoOperable,
DismissConfirmation,
Done,
NeedReview
}
```

None: User hasn't taken actions.
NoOperable: User cannot take actions.
DismissConfirmation: User dismissed the insight but hasn't confirm yet.
Done: User has taken actions.
NeedReview: The status is out of date, needs users' review.

The time away preparation compute listens to three stores: time away preparation store, calendar store and important contact extension store. From the calendar store, the compute will know the meetings within this time away duration. From the important contact extension store, the compute will know the important contacts of user, and the important contacts will be the recipients in the "notify collaborators" insight. The computed result is four insight instances, including time away preparation state and meetings during time away. The front-end logic will be divided into two pull requests (PRs), the resolve meetings part will be in the $2^{nd}$ PR, so there's no meetings related compute in the $1^{st}$ PR. The computed insight instances are passed to roll up logic, and then to insight factory and used to render the interface element 110, also referred to as a feed card.

The time away preparation store listens to actions from time away preparation action creator and feed a weve entity service (WES) insight action creator. WES is a backend service that empowers the add-in functionality. The time away preparation action creator is called in time away preparation detail container to handle users' actions on this feature. The feed WES insight action creator gets all feed insights during Add-in boot process and refresh these insights every 15 minutes. The important people extension store is a new store to store the data from user interface element 135 via an existing IPS++ service. PS++ is a solution for providing suggestions about who are the user's important people.

A new action creator named ImportantContactExtensionActionCreator is added to request IPS++ from 1E and update the store. The action creator will request IPS++ every 60 minutes. Within the compute, 4 sub-insights are generated, and each sub-insight stands for one preparation task. The insights are generated and parsed. The 4 sub-insights in this compute unit's output are different from the back-end insight. The one-time away preparation insight is converted to four sub-insights and each one used to render one insight card.

There is a roll up logic named TimeAwayInsightsRollUp which simply merge the four insights together. The roll up insight is passed to the feed card.

The time away preparation feed card is different from preview feed card, its preview part contains multiple items. So, a new preview feed card class is built to handle this case: *MultiItemsPreviewFeedCard:*

```
export abstract classMultiItemsPreviewFeedCard<TInstance extends
IRollupInstanceData, State> extends
PreviewFeedCard<IRollupInstanceData, State> {
  ...
  protected abstract buildPreviewItemIcon(instance: IInsight):
  JSX.Element;
  protected abstract buildPreviewItemComponent(instance: IInsight):
  JSX.Element;
  ...
  protected buildPreview( ): JSX.Element {
    return (<List items={this.instance.rolledUpInsights.map((item) =>
    this.buildPreviewItem(item))}/>);
  }
  private buildPreviewItem(instance: IInsight): JSX.Element {
    return (
      <div className={styles.rowContainer}>
        <div className={'${styles.leftIconContainer}
        ${styles.horizontalCenter}'}>
          {this.buildPreviewItemIcon(instance)}
        </div>
        <div className={'${styles.insightDescriptionContainer}
        ${styles.verticalCenter}'}>
          {this.buildPreviewItemComponent(instance)}
        </div>
      </div>
    );
  }
}
```

The MultiItemsPreviewFeedCard inherits PreviewFeedCard and overwrites the buildPreview( ) method, it builds multi-line preview content according to the rolled-up insight. And the TimeAwayPreparationFeedCard inherits the MultiItemsPreviewFeedCard.

An insight detail container is different from normal insight detail containers, which contain multiple insight cards of the same kind. In this scenario, the cards are all different. And there are several "titles" in this container, e.g. "COMPLETED" or "NEED REVIEW", so that we need to group these insights by their kind or status. A new component named MultiplePartsInsightDetails is built to handle this case:
*MultiplePartsInsightDetails*

```
export interface IProps extends IInsightDetailsProps {
  groupedinsights: IInsightsGroup[ ];
  wrapInsightsAsGroup(insightsGroup: IInsightsGroup): JSX.Element;
}
export class MultiplePartsInsightDetails extends InsightDetails<IProps>{
  protected buildDetailCards( ): JSX.Element {
    return (<SimpleList items={this.props.groupedInsights.map((group)
    =>
    this.props.wrapInsightsAsGroup(group))}/>);
  }
}
```

To use this component, grouped insights and an insights group render function are passed to this component. They are in defined in TimeAwayPreparatoryTasksContainer. The TimeAwayPreparatoryTasksContainer groups the insights and leverage MultiplePartsInsightDetails to render the container. The group render function(wrapInsightsAsGroup) is to add the titles here. Within each group, the insights are sorted by display order.

The head container is rendered by the insights router without changes. There is a back button, a dashboard button, a settings button and a feedback button.

The container contains three parts and their titles, to-do group, need review group, and completed group. As an example group order: The insights that the user can take actions on will be ranked at the top, followed by the completed insights, with the need review insights presented at the end. The preparation state is kept and updated in the store, and every task detail status is kept in the detail card. As a result, there is no state that is maintained in this container component.

The to-do group contains some detail cards that user can take actions on. The out of date task preparation, which user has already taken actions on but then changed the schedule, is rendered as a need review card. The completed or need review preparation is rendered as a completed card, the need review card and completed card are preview card with a "need review" or "completed" icon. The dismissed preparations are not shown in the container page.

All four insight cards are rendered by TimeAwayPreparationTaskCard:

*TimeAwayPreparationTaskCard*

```
...
private mapChildInsightsToCard(instance:
ITimeAwayPreparationInstanceData): JSX.Element {
    if (instance.IsSegment( )){...Show segment...}
    else{
        switch (instance.preparatoryStatus) {
            case PreparationStatus.Unoperable: ...
            case PreparationStatus.None: switch
(instance.identifider.secondaryId) {...}
            case PreparationStatus.Completed: ...
            case PreparationStatus.NeedReview: ...
            case PreparationStatus.DismissConfirmation: ...
            default: ...do nothing...;
        }
    }
}
...
```

This component will render different cards according to the insight's preparatory status and secondary id, which is the preparatory task name.

Additionally, there are four detail cards, one dismiss confirmation card and one completed card leveraged by the TimeAwayPreparationTaskCard. There is a new component named time-away-preparatory-work-detail card, which is the base class for the four detail cards and keeps the property of the type insight instance and the four detail cards hold their own component state. The task cards leverage time away preparation action creator to create actions, and these actions are used in WES insight requests.

The dismiss confirmation card extends "card base", which is a simple card that contains 3 buttons, back button, complete button and dismiss button. This card executes the "UpdateTimeAwayRecordAction" or insight dismiss action. In this scenario, a front-end dismiss is sufficient. The dismissed insights will be filtered by IdentifiersAreEqualFilter. If user dismiss one sub-insight, this sub-insight's name and time away record identifier will be stored in action log, so next time the user actions on the same time away record, the dismissed insight will be filtered. The dismiss action will trigger the compute in the meantime, so it will take effect immediately. Note that the book time away duration insight cannot be dismissed.

The Book Time Away Card component state contains time away duration:

```
interface IState{
    StartTime: Date;
    EndTime: Date;
}
```

The time away duration has a default value of next day whole day. Either set the start time or set the end time will change the component state. The start time set allowed range is from today to +∞, the end time set allowed range is from start time to +∞. The time away duration can only be all days, so the start time means "the beginning of that day" and the end time means "the end of that day". The "Schedule" button calls the bookTimeAwayDurationActionAndDispatch( ) function via feed WES insight action creator to make WES action request. If the WES request's response is all right, dispatch the book OOF meeting action. Then request for the latest insight and update the store. Nothing is done in response to A WES request failing. If the calendar API request to book OOF meeting fails, skip the book time away duration action.

The Email Auto-reply Card includes one editable test box and one check box for user to configure. The "Send inside my organization" check box cannot be canceled according to Outlook mailbox settings. The initial email text is:

"I will be out of the office from 06/08/2019 to 06/31/2019 and will have limited access to email. If this is urgent, please contact [NAME] at [EMAIL] or [PHONE]. I will do my best to respond promptly to your email when I return.

Sent by MyAnalytics"

Clicking the "Save button" dispatches the update time away record action and set auto reply action with parameters of auto reply settings. The back end will execute the 2 actions. If the set auto replies action fails the update time away record action is skipped and an internal server error is returned.

Figure 24:
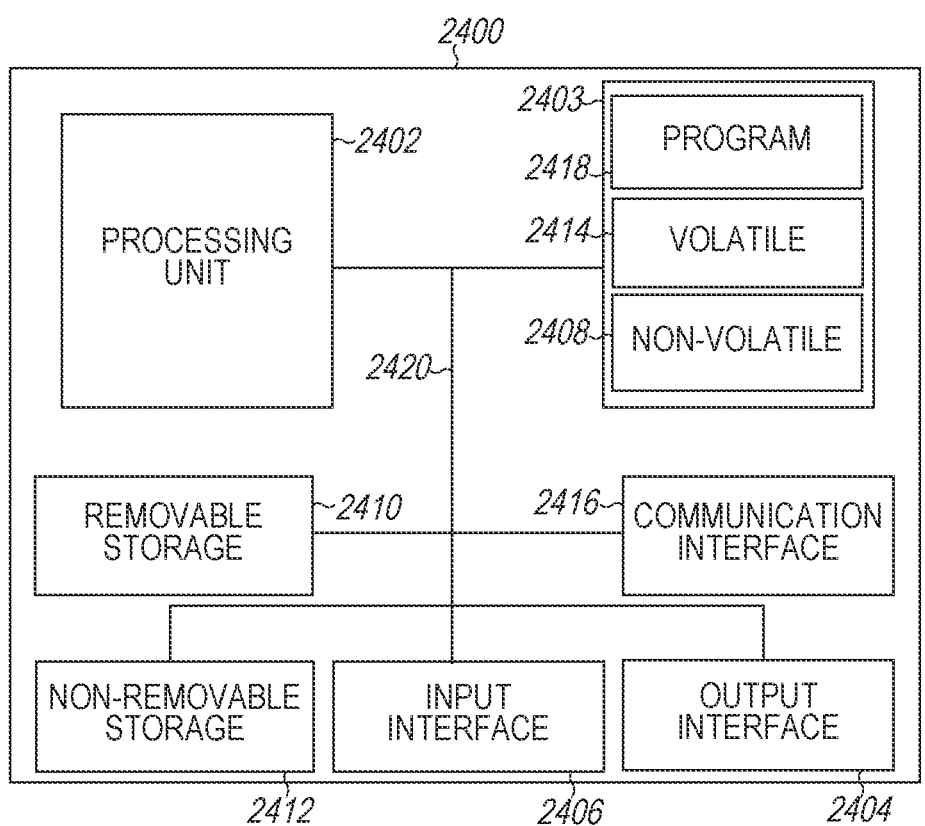
FIG. 24 is a block schematic diagram of a computer system to implement one or more example embodiments.
Figure 25:
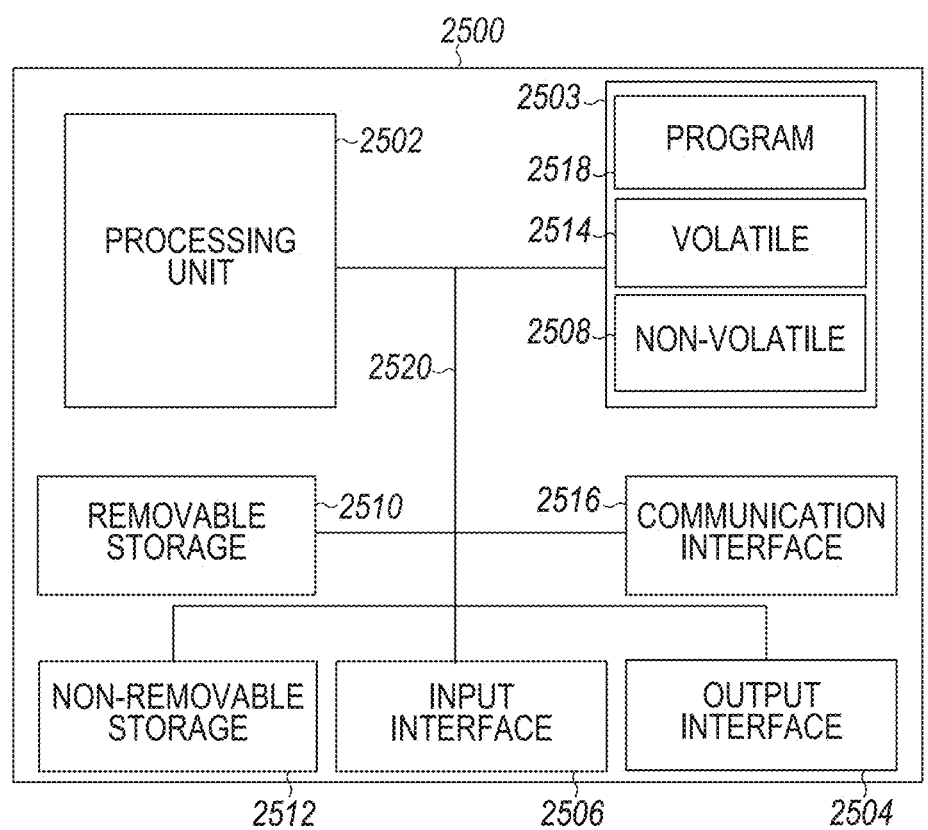

FIG. 24 is a block schematic diagram of a computer system 2400 to implement the time away management mechanism, processing units, and analytics engine, and for performing methods and algorithms according to example embodiments. All components need not be used in various embodiments.

One example computing device in the form of a computer 2400 may include a processing unit 2402, memory 2403, removable storage 2410, and non-removable storage 2412. Although the example computing device is illustrated and described as computer 2400, the computing device may be in different forms in different embodiments. For example, the computing device may instead be a smartphone, a tablet, smartwatch, smart storage device (SSD), or other computing device including the same or similar elements as illustrated and described with regard to FIG. 24. Devices, such as smartphones, tablets, and smartwatches, are generally collectively referred to as mobile devices or user equipment.

Although the various data storage elements are illustrated as part of the computer 2400, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 2403 may include volatile memory 2414 and non-volatile memory 2408. Computer 2400 may include— or have access to a computing environment that includes—a variety of computer-readable media, such as volatile memory 2414 and non-volatile memory 2408, removable storage 2410 and non-removable storage 2412. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 2400 may include or have access to a computing environment that includes input interface 2406, output interface 2404, and a communication interface 2416. Output interface 2404 may include a display device, such as a touchscreen, that also may serve as an input device. The input interface 2406 may include one or more of a touchscreen, touchpad, mouse, keyboard, camera, one or more device-specific buttons, one or more sensors integrated within or coupled via wired or wireless data connections to the computer 2400, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 2400 are connected with a system bus 2420.

Computer-readable instructions stored on a computer-readable medium are executable by the processing unit 2402 of the computer 2400, such as a program 2418. The program 2418 in some embodiments comprises software to implement one or more functions and algorithms described herein and for generated and populating user interfaces, such as interfaces referred to as cards. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 2418 along with the workspace manager 2422 may be used to cause processing unit 2402 to perform one or more methods or algorithms described herein.

EXAMPLES

Example 1. A computer implemented method includes receiving a start date and an end date specifying a future away-from-work time period for a user, generating an away-from-work communication specifying the away from office time period, retrieving via the computer a list of collaborators based on frequency and duration of recent interactions with the user, receiving via the computer a selection of collaborators from the list, identifying meetings involving the user during the away-from-work time period, generating via the computer a user viewable list of items for the user to complete prior to the away-from-work time period, and generating via the computer a list of items for the user to attend to upon return from the away-from-work time period for presentation to the user upon return.

Example 2. The method of example 1 and further comprising sending a communication to the selected collaborators indicating the user will be away-from-work.

Example 3. The method of any of examples 1-2 and further including identifying a contact for each identified meeting and informing each such contact of the user's being away-from-work.

Example 4. The method of any of examples 1-3 and further including identifying documents associated with the list of items for the user to attend to upon return form the away-from-work time period.

Example 5. The method of example 4 wherein the documents are identified based on at least one of documents attached to meeting notices for meeting occurring during the away-from-work time period, documents attached to replies to such meeting notices, and documents having similar titles, recipients, and in similar threads that the user is associated with.

Example 6. The method of any of examples 1-5 wherein the list of collaborators is retrieved from a data store containing aggregations of previously monitored user interactions with collaborators, including email and meeting notices.

Example 7. The method of any of examples 1-6 wherein the generated list of items for the user to attend to upon return includes a suggested meeting with a selected collaborator based on prior frequency and length of interactions.

Example 8. The method of example 7 wherein the frequency and length of interactions include email between the user and the selected collaborator, length of threads between the user and the selected collaborator, and frequency of meetings including the user and the selected collaborator.

Example 9. A machine-readable storage device having instructions for execution by a processor of a machine to cause the processor to perform operations to perform a method. The operations include receiving a start date and an end date specifying a future away-from-work time period for a user, generating an away from office communication specifying the away from office time period, retrieving a list of collaborators based on frequency and duration of recent interactions with the user, receiving a selection of collaborators from the list, identifying meetings involving the user during the time period, generating via the computer a user viewable list of items for the user to complete prior to the away-from-work time period, and generating via the computer a list of items for the user to attend to upon return from the away-from-work time period for presentation to the user upon return.

Example 10. The device of example 9 wherein the operations further include sending a communication to the selected collaborators indicating the user will be away-from-work.

Example 11. The device of any of examples 9-10 wherein the operations further include identifying a contact for each identified meeting and informing each such contact of the user's being away-from-work.

Example 12. The device of any of examples 9-11 wherein the operations further include identifying documents associated with the list of items for the user to attend to upon return form the away-from-work time period.

Example 13. The device of example 12 wherein the documents are identified based on at least one of documents attached to meeting notices for meeting occurring during the away-from-work time period, documents attached to replies to such meeting notices, and documents having similar titles, recipients, and in similar threads that the user is associated with.

Example 14. The device of any of examples 9-13 wherein the list of collaborators is retrieved from a data store containing aggregations of previously monitored user interactions with collaborators, including email and meeting notices.

Example 15. The device of any of examples 9-14 wherein the generated list of items for the user to attend to upon return includes a suggested meeting with a selected collaborator based on prior frequency and length of interactions and wherein the frequency and length of interactions include email between the user and the selected collaborator, length of threads between the user and the selected collaborator, and frequency of meetings including the user and the selected collaborator.

Example 16. A device includes a processor and a memory device coupled to the processor and having a program stored thereon for execution by the processor to perform operations including receiving a start date and an end date specifying a future away-from-work time period for a user, generating an away from office communication specifying the away-from-work time period, retrieving a list of collaborators based on frequency and duration of recent interactions with the user, receiving a selection of collaborators from the list, identifying meetings involving the user during the away-from-work time period, generating a user viewable list of items for the user to complete prior to the time period, and generating via the computer a list of items for the user to attend to upon return from the time period for presentation to the user upon return.

Example 17. The device of example 16 and wherein the operations further include sending a communication to the selected collaborators indicating the user will be away-from-work.

Example 18. The device of any of examples 16-17 wherein the operations further include identifying a contact for each identified meeting and informing each such contact of the user's being away-from-work.

Example 19. The device of any of examples 16-18 wherein the operations further include identifying documents associated with the list of items for the user to attend to upon return form the away-from-work time period.

Example 20. The device of example 19 wherein the documents are identified based on at least one of documents attached to meeting notices for meeting occurring during the away-from-work time period, documents attached to replies to such meeting notices, and documents having similar titles, recipients, and in similar threads that the user is associated with, wherein the list of collaborators is retrieved from a data store containing aggregations of previously monitored user interactions with collaborators, including email and meeting notices.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer-implemented method comprising:
   generating a consolidated graphical user interface of a communication application implemented with at least one processor of a computer, the consolidated graphical user interface comprising a sidebar having a plurality of expandable boxes, each box providing access to a corresponding function of the communication application;
   receiving, in a first expandable box of the plurality of expandable boxes, a start date and an end date specifying a future away-from-work time period for a user, the first expandable box providing access to calendar functions of the communication application;
   detecting a selection of a composition graphical user interface element in a second expandable box of the plurality of expandable boxes, the second expandable box providing access to messaging functions of the communication application;
   in response to detecting the selection of the composition graphical user interface element in the second expandable box, expanding the second expandable box to display a message composition field;
   receiving content in the message composition field;
   generating an away-from-office communication specifying the away-from-work time period and content in the message composition field;
   identifying, in a third expandable box of the plurality of expandable boxes, a list of collaborators based on frequency and duration of recent interactions between the collaborators and the user via the communication application, the collaborators comprising other users of the communication application;
   receiving, in the third expandable box of the plurality of expandable boxes, a selection of collaborators from the list of collaborators;
   identifying, in a fourth expandable box of the plurality of expandable boxes, meetings involving the user during the away-from-work time period, the fourth expandable box comprising a meeting decline graphical user interface element;
   generating, in a fifth expandable box of the plurality of expandable boxes, a first list of items for the user to complete prior to the away-from-work time period;
   generating, in a sixth expandable box of the plurality of expandable boxes, a second list of items for the user to attend to upon return from the away-from-work time period for presentation to the user upon return;
   displaying the consolidated graphical user interface that consolidates information comprising the start date, the end date, the selection of collaborators, the identified meetings, the first list of items, and the second list of items; and
   configuring the communication application based on the information from the consolidated graphical user interface.

2. The computer-implemented method of claim 1 further comprising:
   sending a communication to the selected collaborators indicating the user will be away-from-work.

3. The computer-implemented method of claim 1 further comprising:
   identifying a contact for each identified meeting; and
   informing each such contact of the user's being away-from-work.

4. The computer-implemented method of claim 1 further comprising:
   identifying documents associated with the second list of items for the user to attend to upon return from the away-from-work time period.

5. The computer-implemented method of claim 4, wherein the documents are identified based on at least one of documents attached to meeting notices for meeting occurring during the away-from-work time period, documents attached to replies to such meeting notices, and documents having similar titles, recipients, and in similar threads that the user is associated with.

6. The computer-implemented method of claim 1, wherein the list of collaborators is retrieved from a data store containing aggregations of previously monitored user interactions with collaborators, including email and meeting notices.

7. The computer-implemented method of claim 1, wherein the second list of items for the user to attend to upon return includes a suggested meeting with a selected collaborator based on prior frequency and length of interactions.

8. The computer-implemented method of claim 7, wherein the frequency and length of interactions comprise email between the user and the selected collaborator, length of threads between the user and the selected collaborator, and frequency of meetings including the user and the selected collaborator.

9. A machine-readable storage device having instructions for execution by a processor of a machine to cause the processor to perform operations comprising:
generating a consolidated graphical user interface of a communication application implemented with at least one processor of a computer, the consolidated graphical user interface comprising a sidebar having a plurality of expandable boxes, each box providing access to a corresponding function of the communication application;
receiving, in a first expandable box of the plurality of expandable boxes, a start date and an end date specifying a future away-from-work time period for a user, the first expandable box providing access to calendar functions of the communication application;
detecting a selection of a composition graphical user interface element in a second expandable box of the plurality of expandable boxes, the second expandable box providing access to messaging functions of the communication application;
in response to detecting the selection of the composition graphical user interface element in the second expandable box, expanding the second expandable box to display a message composition field;
receiving content in the message composition field;
generating an away-from-office communication specifying the away-from-work time period and content in the message composition field;
identifying, in a third expandable box of the plurality of expandable boxes, a list of collaborators based on frequency and duration of recent interactions between the collaborators and the user via the communication application, the collaborators comprising other users of the communication application;
receiving, in the third expandable box of the plurality of expandable boxes, a selection of collaborators from the list of collaborators;
identifying, in a fourth expandable box of the plurality of expandable boxes, meetings involving the user during the away-from-work time period, the fourth expandable box comprising a meeting decline graphical user interface element;
generating, in a fifth expandable box of the plurality of expandable boxes, a first list of items for the user to complete prior to the away-from-work time period;
generating, in a sixth expandable box of the plurality of expandable boxes, a second list of items for the user to attend to upon return from the away-from-work time period for presentation to the user upon return;
displaying the consolidated graphical user interface that consolidates information comprising the start date, the end date, the selection of collaborators, the identified meetings, the first list of items, and the second list of items; and
configuring the communication application based on the information from the consolidated graphical user interface.

10. The machine-readable storage device of claim 9, wherein the operations further comprise: sending a communication to the selected collaborators indicating the user will be away-from-work;
identifying a contact for each identified meeting;
informing each such contact of the user's being away-from-work; and
identifying documents associated with the list of items for the user to attend to upon return from the away-from-work time period.

11. The machine-readable storage device of claim 10 wherein the documents are identified based on at least one of documents attached to meeting notices for meeting occurring during the away-from-work time period, documents attached to replies to such meeting notices, and documents having similar titles, recipients, and in similar threads that the user is associated with.

12. The machine-readable storage device of claim 9 wherein the list of collaborators is retrieved from a data store containing aggregations of previously monitored user interactions with collaborators, including email and meeting notices.

13. The machine-readable storage device of claim 9 wherein the generated list of items for the user to attend to upon return includes a suggested meeting with a selected collaborator based on prior frequency and length of interactions wherein the frequency and length of interactions comprise email between the user and the selected collaborator, length of threads between the user and the selected collaborator, and frequency of meetings including the user and the selected collaborator.

14. A device comprising:
a processor; and
a memory device coupled to the processor and having a program stored thereon for execution by the processor to perform operations comprising:
generating a consolidated graphical user interface of a communication application implemented with at least one processor of a computer, the consolidated graphical user interface comprising a sidebar having a plurality of expandable boxes, each box providing access to a corresponding function of the communication application;
receiving, in a first expandable box of the plurality of expandable boxes, a start date and an end date specifying a future away-from-work time period for a user, the first expandable box providing access to calendar functions of the communication application;
detecting a selection of a composition graphical user interface element in a second expandable box of the plurality of expandable boxes, the second expandable box providing access to messaging functions of the communication application;
in response to detecting the selection of a composition graphical user interface element in the second expandable box, expanding the second expandable box to display a message composition field;

receiving content in the message composition field;

generating an away-from-office communication specifying the away-from-work time period and content in the message composition field;

identifying, in a third expandable box of the plurality of expandable boxes, a list of collaborators based on frequency and duration of recent interactions between the collaborators and the user via the communication application, the collaborators comprising other users of the communication application;

receiving, in the third expandable box of the plurality of expandable boxes, a selection of collaborators from the list of collaborators;

identifying, in a fourth expandable box of the plurality of expandable boxes, meetings involving the user during the away-from-work time period, the fourth expandable box comprising a meeting decline graphical user interface element;

generating, in a fifth expandable box of the plurality of expandable boxes, a first list of items for the user to complete prior to the away-from-work time period;

generating, in a sixth expandable box of the plurality of expandable boxes, a second list of items for the user to attend to upon return from the away-from-work time period for presentation to the user upon return;

displaying the consolidated graphical user interface that consolidates information comprising the start date, the end date, the selection of collaborators, the identified meetings, the first list of items, and the second list of items; and configuring the communication application based on the information from the consolidated graphical user interface.

15. The device of claim 14, wherein the operations further comprise:

sending a communication to the selected collaborators indicating the user will be away-from-work;

identifying a contact for each identified meeting;

informing each such contact of the user's being away-from-work; and identifying documents associated with the list of items for the user to attend to upon return from the-away-from-work time period, wherein the documents are identified based on at least one of documents attached to meeting notices for meeting occurring during the away-from-work time period, documents attached to replies to such meeting notices, and documents having similar titles, recipients, and in similar threads that the user is associated with, wherein the list of collaborators is retrieved from a data store containing aggregations of previously monitored user interactions with collaborators, including email and meeting notices.

* * * * *